US008585495B2

(12) United States Patent
Rosenau et al.

(10) Patent No.: US 8,585,495 B2
(45) **Date of Patent: *Nov. 19, 2013**

(54) PARLAY-BASED TOURNAMENT INCLUDING SUCCESSIVE GAMES

(75) Inventors: David E. Rosenau, Absecon, NJ (US); Leonid M. Bass, Madrid (ES)

(73) Assignee: World Sports Challenge, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,516

(22) Filed: Sep. 14, 2012

(65) Prior Publication Data

US 2013/0072277 A1 Mar. 21, 2013

Related U.S. Application Data

(63) Continuation of application No. 11/771,160, filed on Jun. 29, 2007, now Pat. No. 8,272,950.

(51) Int. Cl.
*G06F 17/00* (2006.01)

(52) U.S. Cl.
USPC ............................................. 463/27; 463/16

(58) Field of Classification Search
USPC ..................................................... 463/16, 27
See application file for complete search history.

(56) References Cited

U.S. PATENT DOCUMENTS

| | | | | |
|---|---|---|---|---|
| 5,779,242 | A | 7/1998 | Kaufmann | |
| 6,669,565 | B2 | 12/2003 | Liegey | |
| 2001/0004609 | A1 | 6/2001 | Walker et al. | |
| 2001/0021666 | A1 | 9/2001 | Yoshida et al. | |
| 2004/0063484 | A1 | 4/2004 | Dreaper et al. | |
| 2005/0278041 | A1 | 12/2005 | Bortnik et al. | |
| 2006/0074504 | A1 | 4/2006 | Maul | |
| 2006/0205483 | A1 | 9/2006 | Meyer et al. | |
| 2011/0034225 | A1* | 2/2011 | Butz et al. | 463/4 |
| 2012/0034974 | A1* | 2/2012 | Amaitis et al. | 463/25 |

OTHER PUBLICATIONS

PCT International Preliminary Report on Patentability for PCT/US08/68089, Date of Mailing: Nov. 25, 2011, 6 pages.
Written Opinion of the International Searching Authority, dated Oct. 7, 2008.
International Search Report for PCT/US2008/680-89, date of mailing: Oct. 7, 2008, 7 pages.

* cited by examiner

*Primary Examiner* — Michael Cuff
(74) *Attorney, Agent, or Firm* — Panitch Schwarze Belisario & Nadel LLP

(57) ABSTRACT

A parlay-based tournament playable by a plurality of players is provided. The tournament includes a plurality of successive games. Each game has a ticket pool and a plurality of results.

20 Claims, 41 Drawing Sheets

TICKETS AND PRIZES CHART

PARLAY-BASED TOURNAMENT INCLUDING SUCCESSIVE GAMES

CROSS-REFERENCE TO RELATED APPLICATIONS

This application is a continuation of copending U.S. application Ser. No. 11/771,160 filed Jun. 29, 2007, the entire disclosure of which is incorporated herein by reference.

BACKGROUND OF THE INVENTION

Many computer-based online predictions tournaments have been designed so that a user/participant may predict the winner of one or more sports games. In these conventional online tournaments, all of the participants' predictions must be made before the start of any of the games. Also, in these conventional online tournaments, a user will know the identity of all of the games that will be predicted at the time the predictions are made.

One example of this type of tournament is an online National Football League (NFL) football pool. In an NFL football pool, each of the teams playing in each NFL game are known prior to the tournament. A participant in the tournament will make predictions about the winners of each of the NFL games that take place during the course of a single week. All of the participants' predictions must be finalized and submitted before the start of the first NFL game of that week. After all of the NFL games have been completed, a winner of the tournament will be determined to be the participant who correctly predicted the most games of that week.

Another example of a conventional online prediction contest is a National Collegiate Athletics Association (NCAA) basketball tournament pool. In the NCAA basketball tournament, which takes place in March of every year, 64 teams play in a six-round single-elimination tournament. In the first round, each of the 64 teams plays a game against one other of the 64 teams (32 total games). At the end of the first round, the 32 teams that lost their game are eliminated from the tournament and the 32 teams that won advance to the next round. In the second round, each of the 32 remaining teams plays against another of the remaining 32 teams, resulting in 16 winners that advance to the next round. This continues until the $6^{th}$ round, in which only two teams remain in the tournament and only one game is played. The winner of the $6^{th}$ round game is the winner of the NCAA basketball tournament.

In an online NCAA basketball tournament pool, the 64 teams in the tournament and the first-round opponent of each team are known prior to the beginning of the tournament. Additionally, each game in each round is paired with another game in that round such that the two winners of the pair of games will play against each other in the subsequent round. Thus, the potential opponents in each game of each round are known prior to the beginning of the tournament. Before the beginning of the first game, a participant in the pool will predict the winner of each of the first-round games. Also, at that time, the participant will predict the winner of each game in all six rounds of the tournament, with each round's predicted winners based on that user's predicted winners from the previous round. At the end of the tournament, the winner of the contest is determined to be the participant who correctly predicted the most winners over the course of the entire tournament. In another embodiment of this contest, the games of later rounds are given a higher weighting than the games in earlier rounds in determining the winner of the pool.

BRIEF SUMMARY OF THE INVENTION

A parlay-based tournament playable by a plurality of players is provided. The tournament includes a plurality of successive games. Each game has a ticket pool and a plurality of results. An administration computer administers the parlay-based tournament. The tournament operates as follows:

1. A first game is identified.
2. Ticket orders are accepted from a plurality of players prior to the outcome of the first game. Players select a game result for the first game for each of their tickets. The total amount of accepted ticket orders defines the ticket pool for the first game. This step is preferably performed without informing each player of the game results selected in the ticket orders of the other players.
3. The tickets in the ticket pool that successfully selected the result of the first game are identified.
4. A second game is identified.
5. The tickets that successfully selected the first game result are parlayed to the second game. The total amount of parlayed tickets define the ticket pool for the second game.
6. Prior to the outcome of the second game, players who have parlayed tickets select a game result for the second game for each of their parlayed tickets.
7. The tickets in the ticket pool of the second game that successfully selected the result of the second game are identified.
8. This process may be repeated for one or more additional successive games until the ticket pool reaches a predetermined number of tickets.

BRIEF DESCRIPTION OF THE DRAWINGS

The above summary, as well as the following detailed description of preferred embodiments of the invention, will be better understood when read in conjunction with the following drawings. For the purpose of illustrating the invention, the drawings show embodiments that are presently preferred, and examples of how the invention is used in a real world project. It should be understood, however, that the invention is not limited to the precise arrangements and instrumentalities shown. In the drawings.

The "Red" tickets referred to below are shown as boxed numbers (bracketed numbers in the lower portions of FIGS. 19-22).

DETAILED DESCRIPTION OF THE INVENTION

I. Overview of Present Invention

Figure 25:
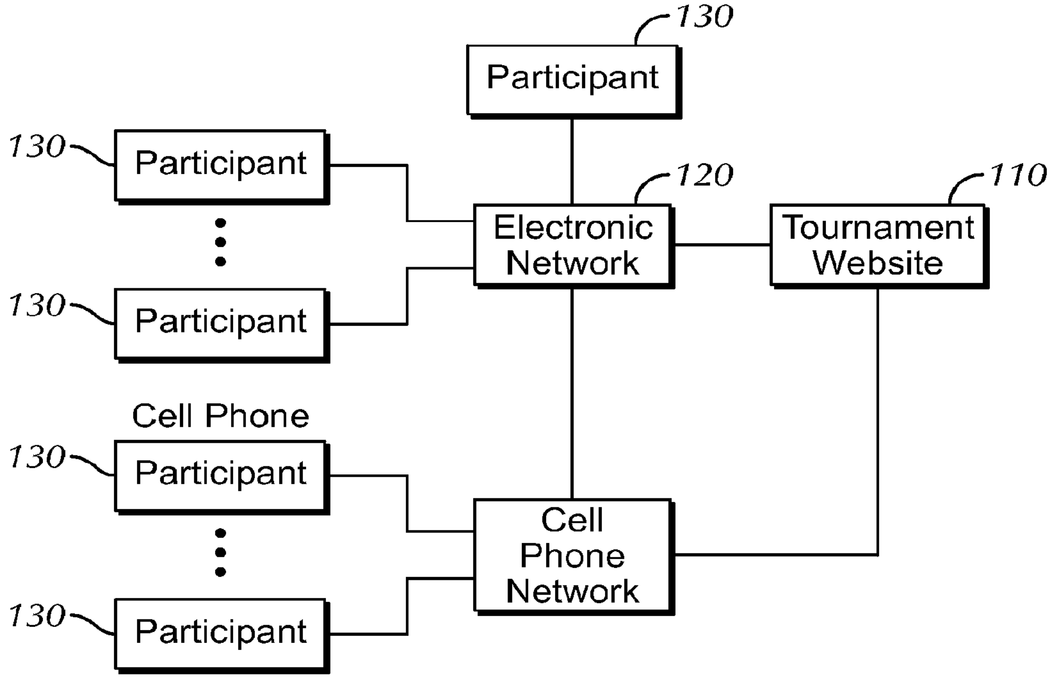
FIG. 25 is a schematic block diagram in accordance with one preferred embodiment of the present invention.

The present invention relates to parlay-based online tournaments wherein users participate over the internet by purchasing tickets and then choosing the winners of real sports competitions. Referring to the drawings in detail, wherein like reference numerals indicate like elements throughout, FIG. 25 shows a system for administering a parlay-based tournament 100 in accordance with preferred embodiments of the present invention. The system 100 is administered by a tournament website 110. A plurality of participants 130 access the tournament website 110 via an electronic network 120, such as the internet, or via a cell phone network 140 so that the participants 130 can participate in the tournament. The participants 130 may communicate with the tournament website 110 via a browser-based user interface, a cell phone, or any other form of communication media. The cell phone network 140 may communicate directly with the tournament website 110 or indirectly via the electronic network 120. At the end of a tournament, "place prizes" are awarded to a predetermined number of participants that were the most successful at predicting the winners of the sports competitions during the tournament.

Figure 26:
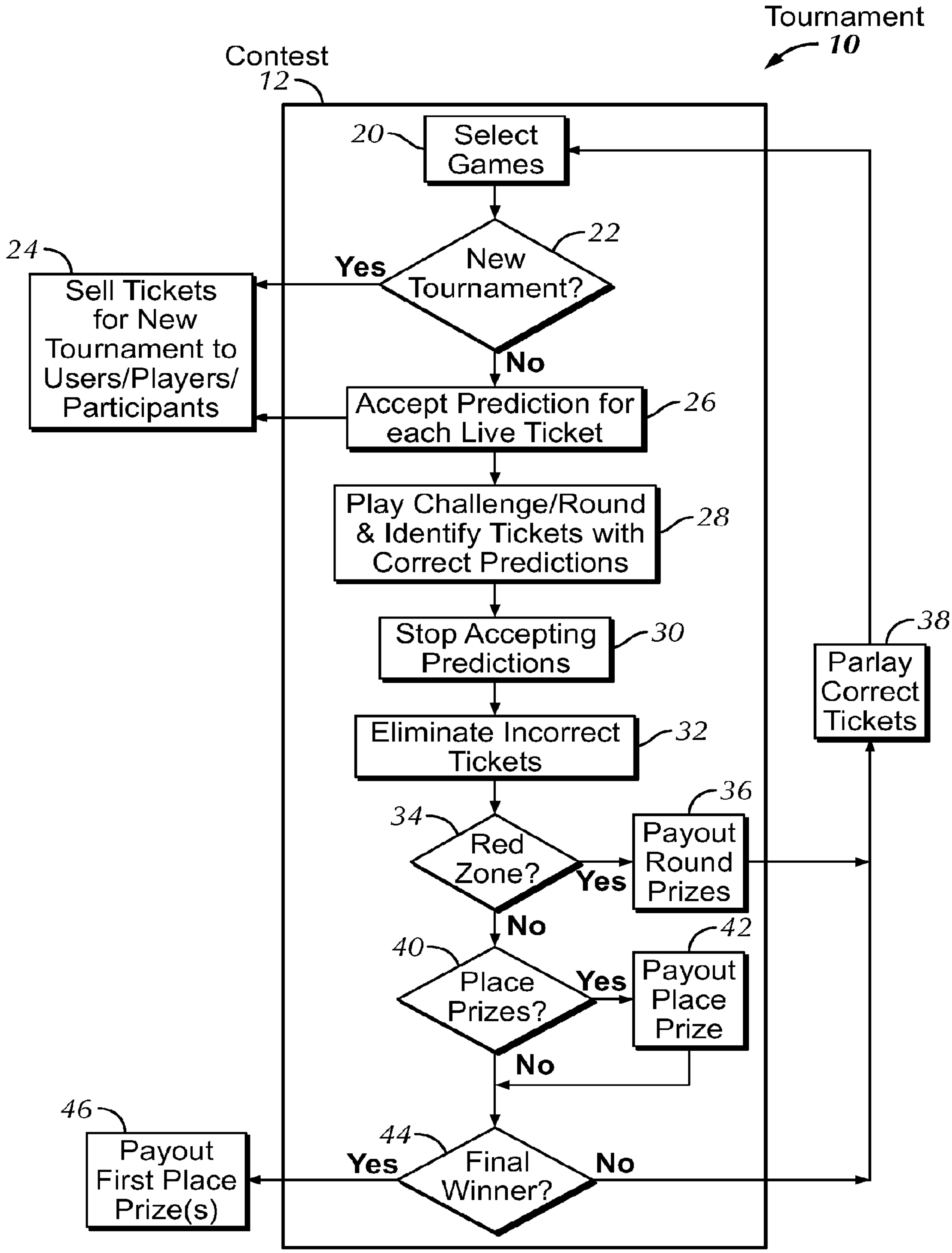
FIG. 26 is a flowchart in accordance with one preferred embodiment of the present invention.

FIG. 26 shows a method of administering a parlay-based tournament 10 (also referred to as a "Challenge") in accordance with preferred embodiments of the present invention. The tournament 10 includes a succession of contests (also referred to as "games") 12, with each contest 12 of a tournament 10 taking place after the previous contest 12 has been completed. Winners of each successive contest 12 are parlayed/advanced into a subsequent contest 12 until a winner of the entire tournament 10 is determined. The first step 20 of a contest 12 is the identification of at least one event, such as a sporting event, that will be predicted in the contest. Each event will have at least two possible results that are mutually exclusive, such as a first team winning a sporting event or a second team winning the same sporting event. The identities of the events and the possible results will be posted on the tournament website 110 (see FIG. 1). In one preferred embodiment, at the time a contest 12 is identified, none of the events in a contest 12 will have occurred yet. Thus, at that time, it will not be known which of the potential contest results will be correct. In other embodiments, a contest 12 may be divided up over multiple time periods so that some of the events in the contest 12 are completed before other events are predicted.

The second step 22 of the contest is to determine whether the contest is the first contest of the tournament in which is it included. If it is the first contest, then the third step 24 of the contest 10 is for a plurality of tickets to be sold to a plurality of participants 130 in the tournament 10. Each participant 130 can purchase one or more tickets 46 for the tournament. If the contest 12 is not the first contest 12 of the tournament 10, then the third step 24 is skipped. Thus, tickets for the tournament 10 can only be purchased for the tournament 10 prior to the occurrence of the events of the first contest 12.

In the fourth step 26, for each ticket that has been purchased (in the first contest 12) or that has been advanced from a prior contest 12 (in subsequent contests 12), a prediction will be accepted from the corresponding participant 130 as to which of the potential results for a contest 12 will actually occur. The aggregate of the tickets in a contest 12 are collectively referred to as a pool of "Live Tickets." A single participant 130 may have multiple tickets with predictions for the same results, as well as multiple tickets with predictions for different results for the same contest 12. At the time the predictions are accepted, no information will be made available by the tournament website 110 as to how many tickets have been predicted for each possible result of the contest 12.

In the fifth step 46, a preset time limit, such as a 24 hour deadline from the time the contest 12 is posted on the tournament website 10, will be reached so that tickets for the contest 12 will no longer be sold and predictions for the contest 12 will no longer be accepted. For all contests subsequent to the first contest 12, random predictions will be assigned to those tickets for which no predictions have been made. After the 24 hour deadline for ticket selections ends, the Game Splits for that day's selections showing how many tickets were picked for each potential result for each event of the contest are posted on the tournament website 110.

In the next step 28, the events which make up the contest 12 will occur and the results of contest 12 will be determined. Next, in step 30, tickets that did not correctly choose the results of the contest 12 are eliminated from the tournament 10 and the ones that have guessed the correct results are the contest winners.

In the next step 32, the number of Live Tickets is examined in order to make a determination of whether the tournament 10 is in the "red zone". If there are greater than a predetermined number of Live Tickets remaining in the contest 12 (e.g., 60 Live tickets in this example), the tournament is not in the red zone and the contest 12 advances to step 34, where a contest prize is awarded to the participant that purchased each winning ticket. Once step 34 has been completed, a new contest 12 begins and the winning tickets from the completed contest 12 are advanced/parlayed to step 20 of the next contest 12. Tickets which are eliminated do not advance to the next contest 12.

In step 32, if there are fewer than 60 Live Tickets remaining, then the contest 12 is in the red zone and no contest prizes are awarded. Instead, the contest 12 moves to step 48, where a determination is made regarding whether the number of Live Tickets remaining is less than or equal to the predetermined number of place prizes. If there are more Live Tickets remaining than the predetermined number of place prizes, no prizes are awarded to any of the eliminated tickets. If the number of Live Tickets remaining is less than or equal to the number of place prizes, place prizes are awarded to the holders of tickets which were eliminated during the contest and which are eligible to receive the place prizes. No prizes are awarded at this time to advancing tickets.

In next step 50, a determination is made regarding whether the tournament 10 is completed or whether another contest 12 will occur. There are three conditions which will signify the end of a tournament 10: (1) if only one Live Ticket remains, (2) if all the remaining Live Tickets were purchased by the same participant, or (3) if an impasse is declared because all of the tickets have had the same results predicted (a Push) for a predetermined number of successive events. If the tournament 10 is not completed, a new contest begins and the winning tickets from the completed contest 12 are advanced/parlayed to step 20 of the next contest 12. Tickets which have been eliminated do not advance to the next contest 12.

If the tournament 10 is determined to be completed, the remaining place prize(s) are awarded in step 40 to the remaining Live Ticket(s).

II. Detailed Description of One Preferred Embodiment

One of the preferred embodiments of the present invention is described in the context of a web-based platform administered by World Sports Challenge Ltd., London, England. World Sports Challenge Ltd. is also referred to herein as "WSC." However, the scope of the present invention is not limited to this particular implementation of the invention. The present invention is described in the context of a plurality of distributed computers, all of which are linked together by an electronic network, such as the internet. The computers may be any type of computing device that allows a user to interact with a web site via a web browser. For example, the computers may be personal computers (PC) that run a Microsoft Windows® operating system. The computers may also be handheld, wireless devices.

The present invention relates to online game web access where the players (participants) can make bets by purchasing tickets. The players choose the results/winners of real competitions. WSC checks the Live Tickets and eliminates the ones that have guessed the correct results or it advances the winners. WSC also posts, after 24 hours deadline for ticket selections end, the Game Splits for that day's selections showing how many tickets picked each side for each Game of the set.

First, the player purchases a ticket (or several, if the player wishes) to enter a Challenge 10 and the tournament website 110 will post four games. Then the player selects the teams or players that the player thinks will win, and may make different choices on the tickets the player holds. The Player is allowed 24 hours from the moment the games are posted to make his choices before the games begin. Next, as each game in the list finishes, if the player chose correctly, the player advances to the next game. After the first four games are completed, winners are advanced and losers are eliminated. Round prizes are awarded for each and every winning ticket that a player holds. Then four more games will be posted, and the Challenge is on again, with additional Round and place prizes to be won. The Challenge continues until all of the players save one have been eliminated. The champion receives the largest prize, but prizes also go to the top twenty places and to those who chose all of the winners in each scheduled Round. Once again, players holding multiple winning tickets will receive prizes for each of those winning tickets. New Challenges begin every day, calling on the players to pick the winners of the day's top matches and premiere games.

A. The Basic Entity Relationship Flow Diagram

Figure 27:
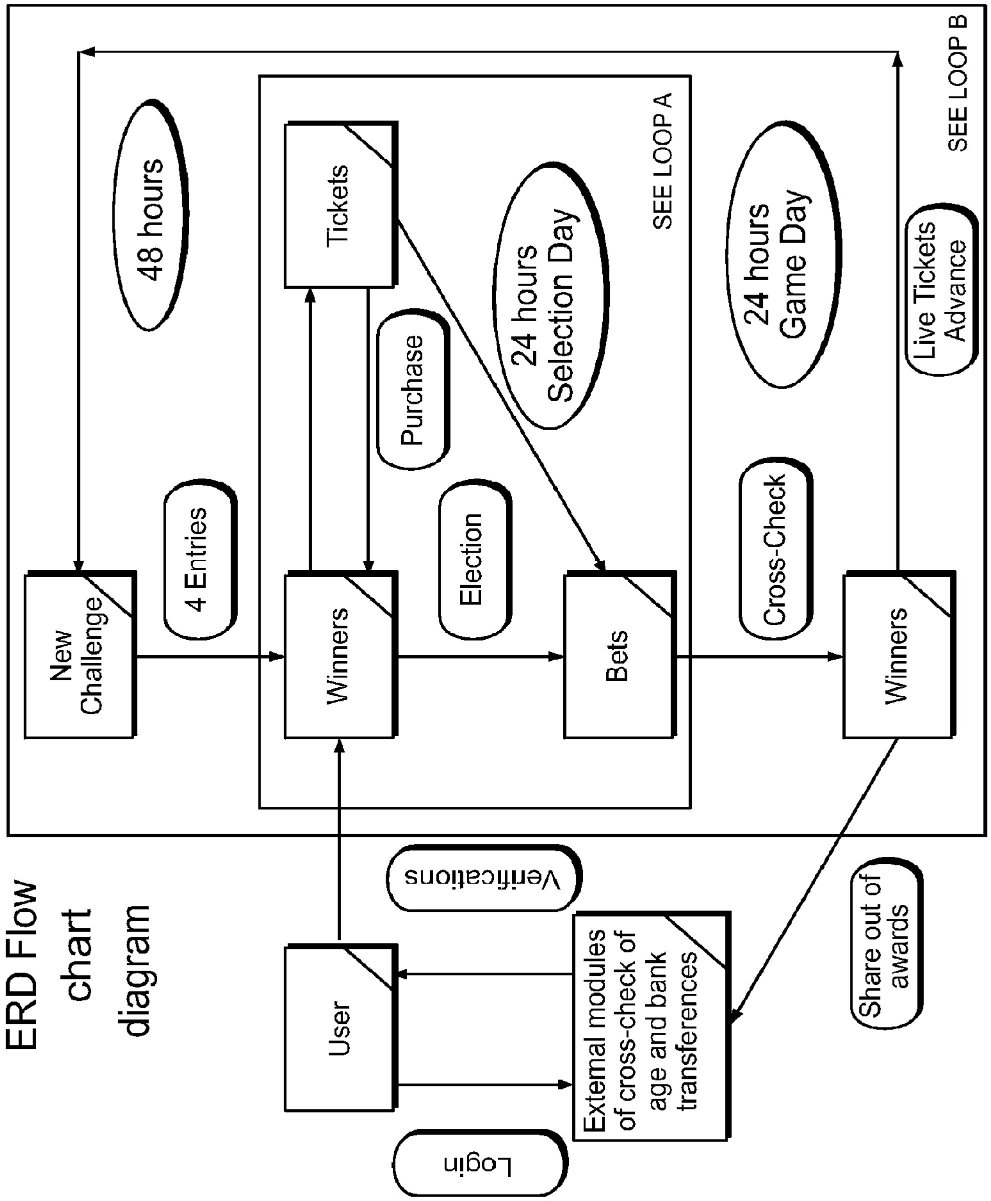
FIG. 27 is an Entity Relationship Diagram (ERD) according to one embodiment of the present invention.

FIG. 27 shows an Entity Relationship flow Diagram according to one embodiment of the present invention. The game is realized by means of the entry of information from two independent points. On the one hand, the update of the new games is realized periodically by WSC and on the other hand the bets are placed by the users who predict the results of these games.

As soon as the identity of the user is verified, the user buys the tickets by means of external modules to the program and chooses his predicted winners. The game verifies the winners periodically and publishes them, distributing the awards automatically when a round is complete.

B. Time Table

Figure 28:
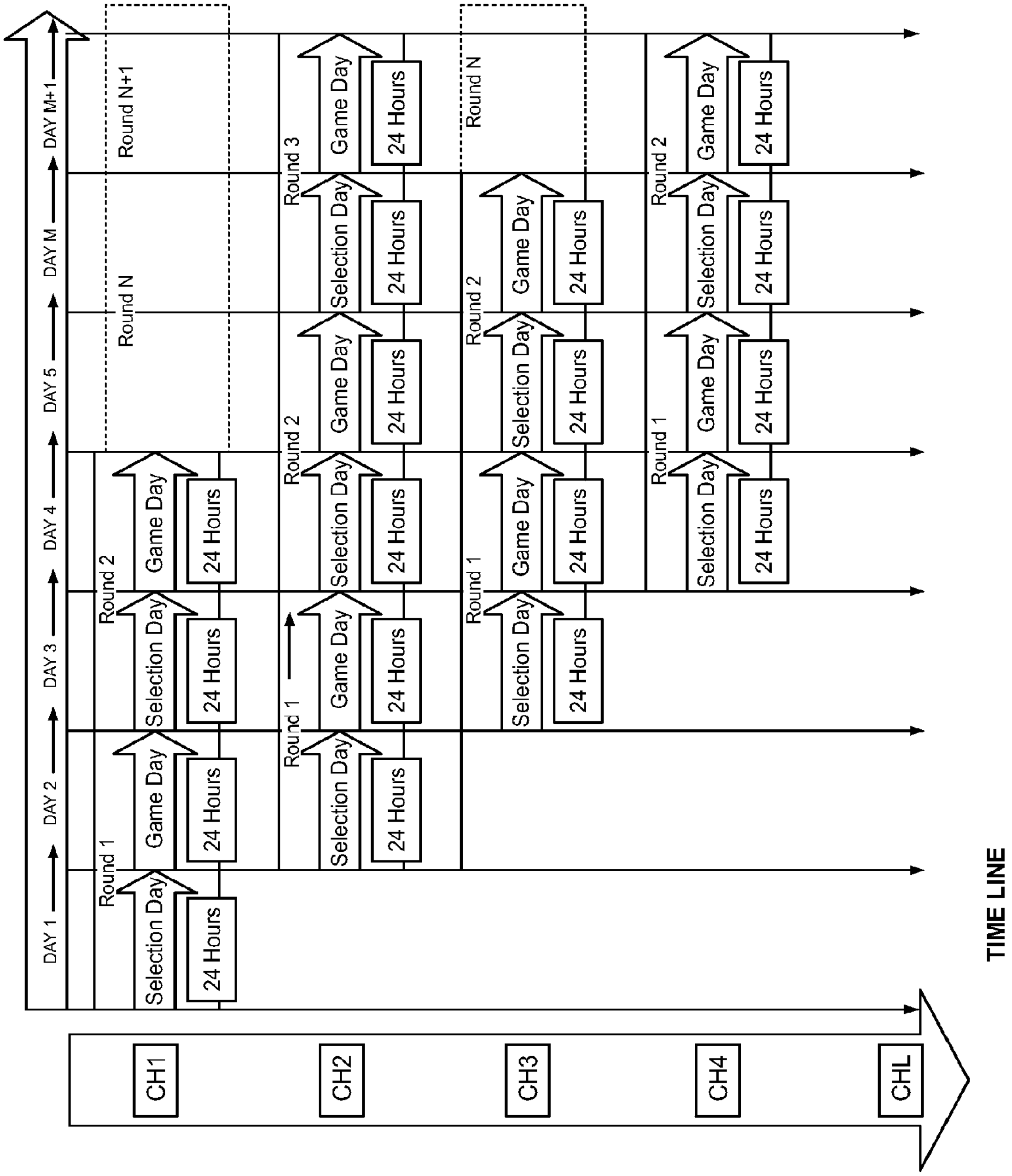
FIG. 28 is a time line in accordance with one preferred embodiment of the present invention.

FIG. 28 shows a timetable for one embodiment of the invention. Every day four new Challenges begin. Players have 24 hours to bet their Live Tickets on Selection Day and then they must wait for the results 24 hours more on Game day. During these 24 hours, another Selection Day begins for another tournament with another four Challenges.

In another embodiment called "Special Challenges," Selection Days are 24-hour and games are played over six-day Game Weeks.

C. Detailed Flowchart

Figure 29A:
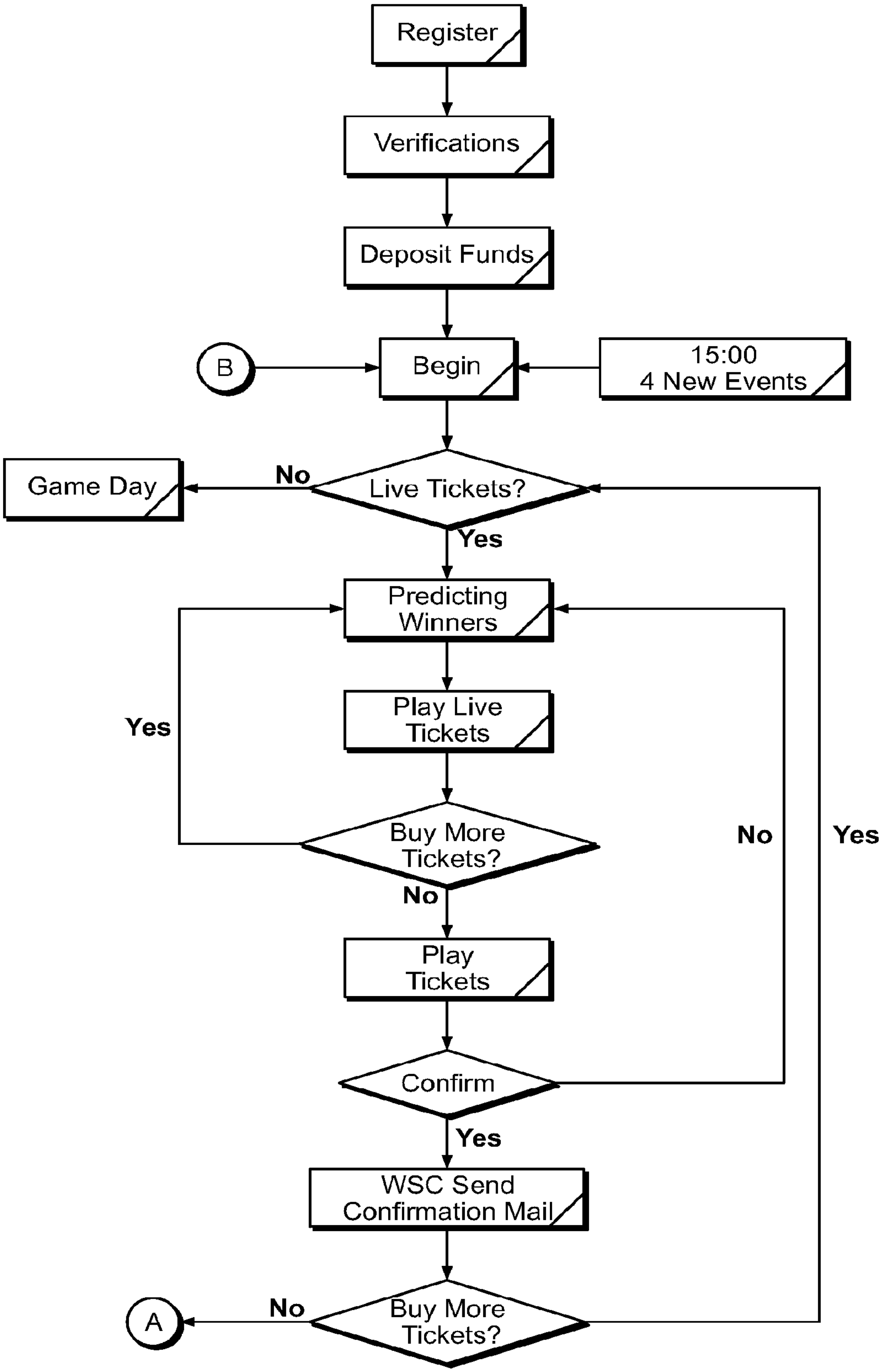
FIGS. 29A and 29B, taken together, is a self-explanatory flowchart of the game process, in accordance with one preferred embodiment of the present invention.
Figure 29B:
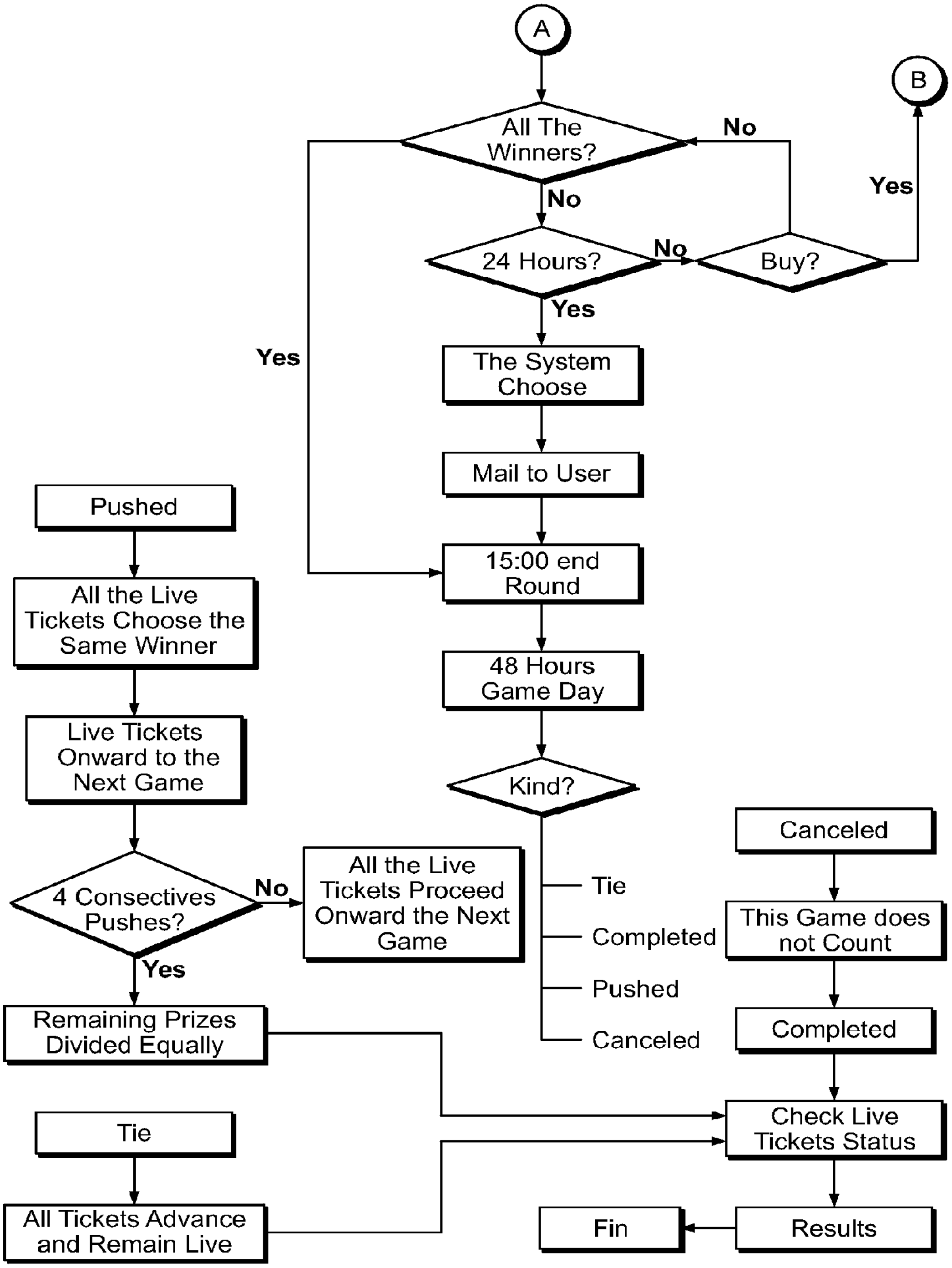
Figure 30A:
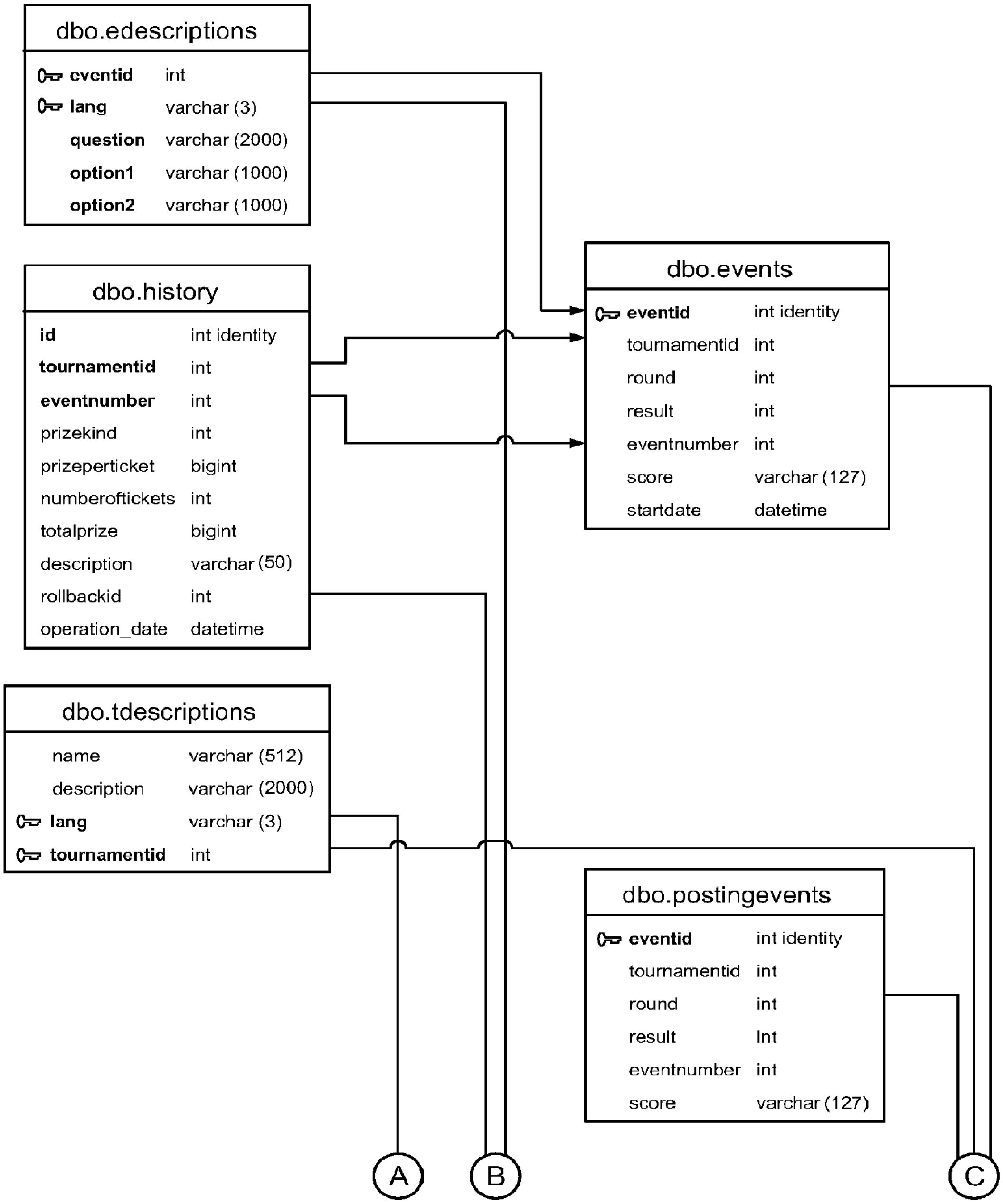
FIGS. 30A-30F, taken together, show database table relationships in accordance with one preferred embodiment of the present invention.
Figure 30B:
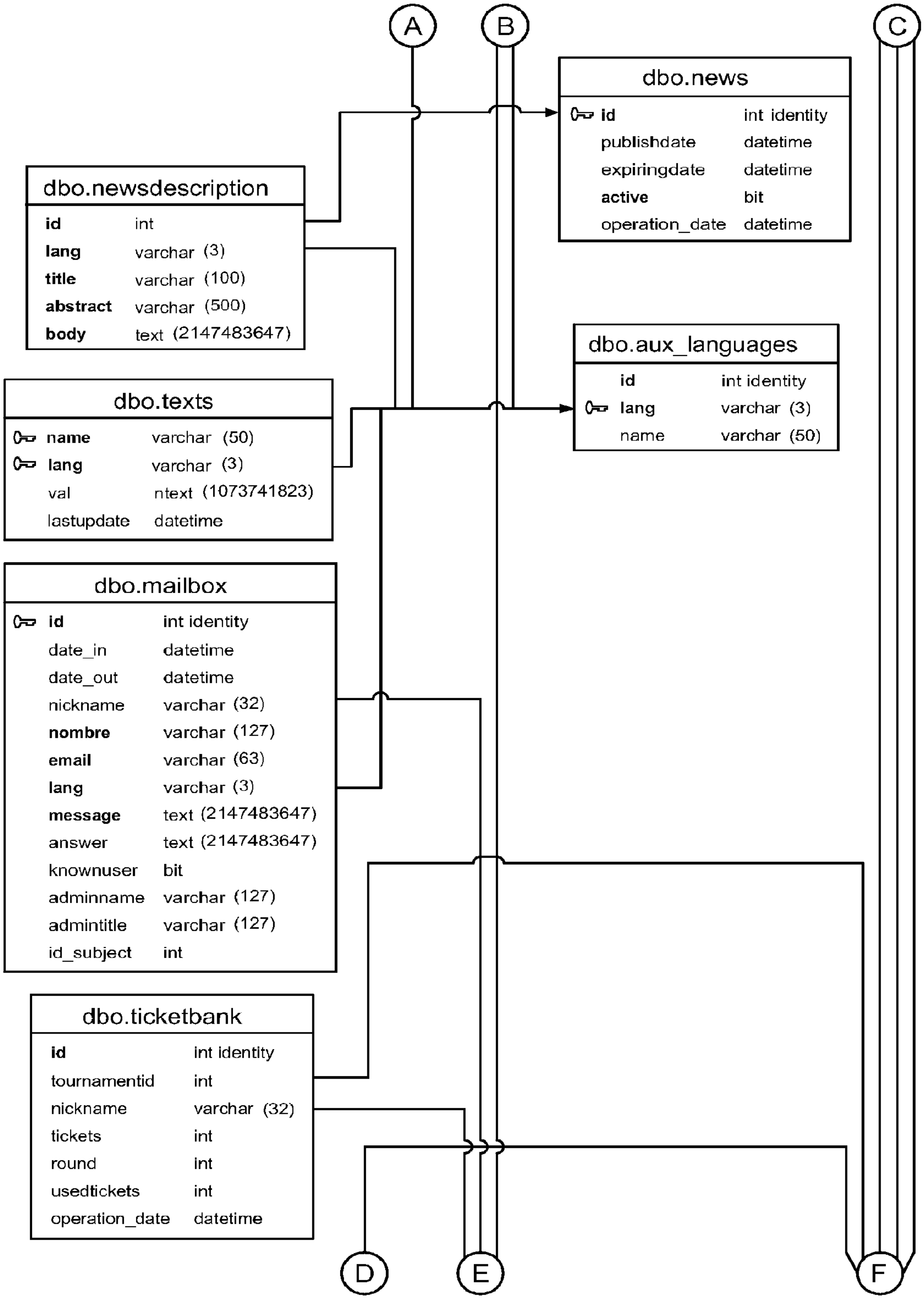
Figure 30C:
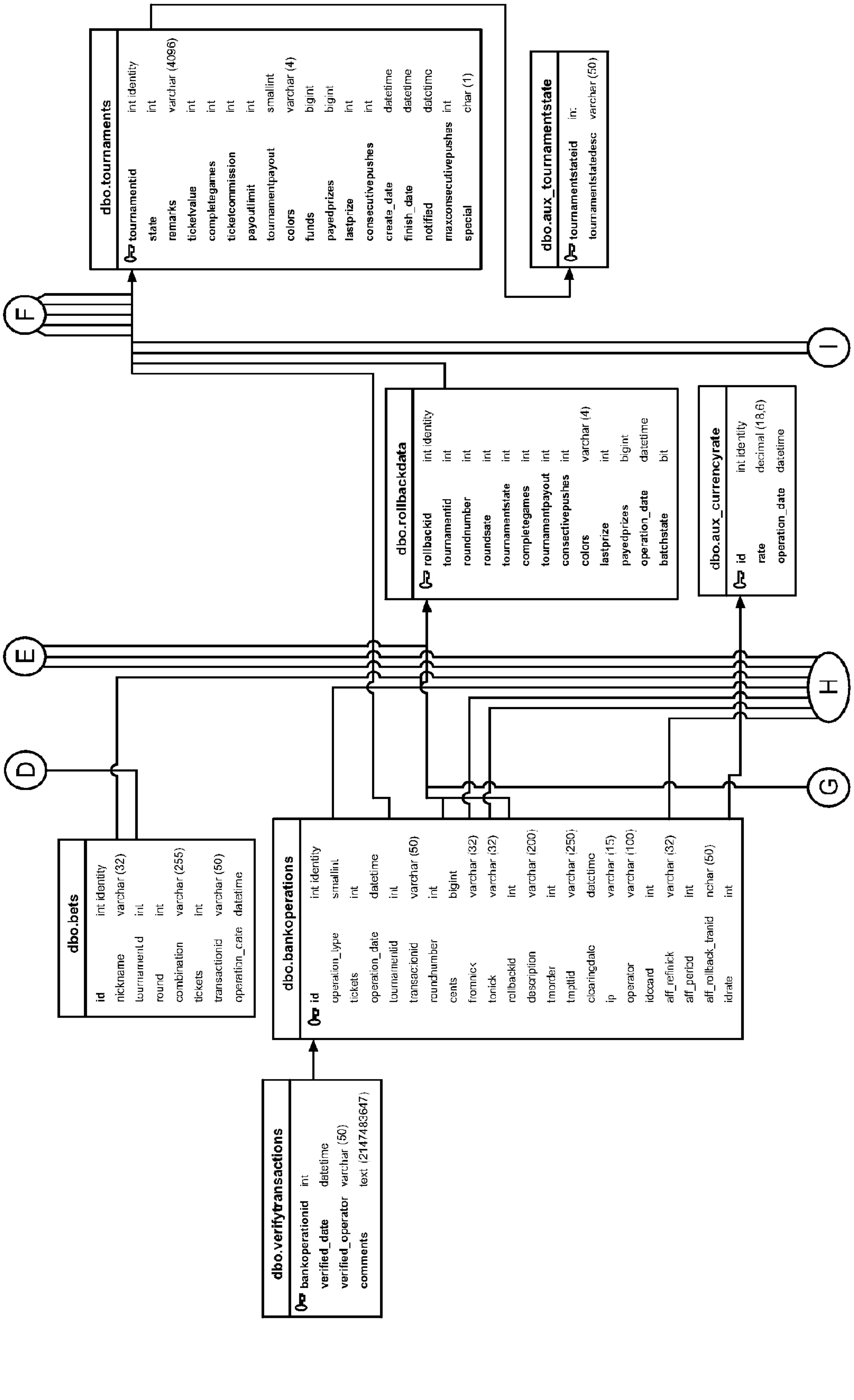
Figure 30D:
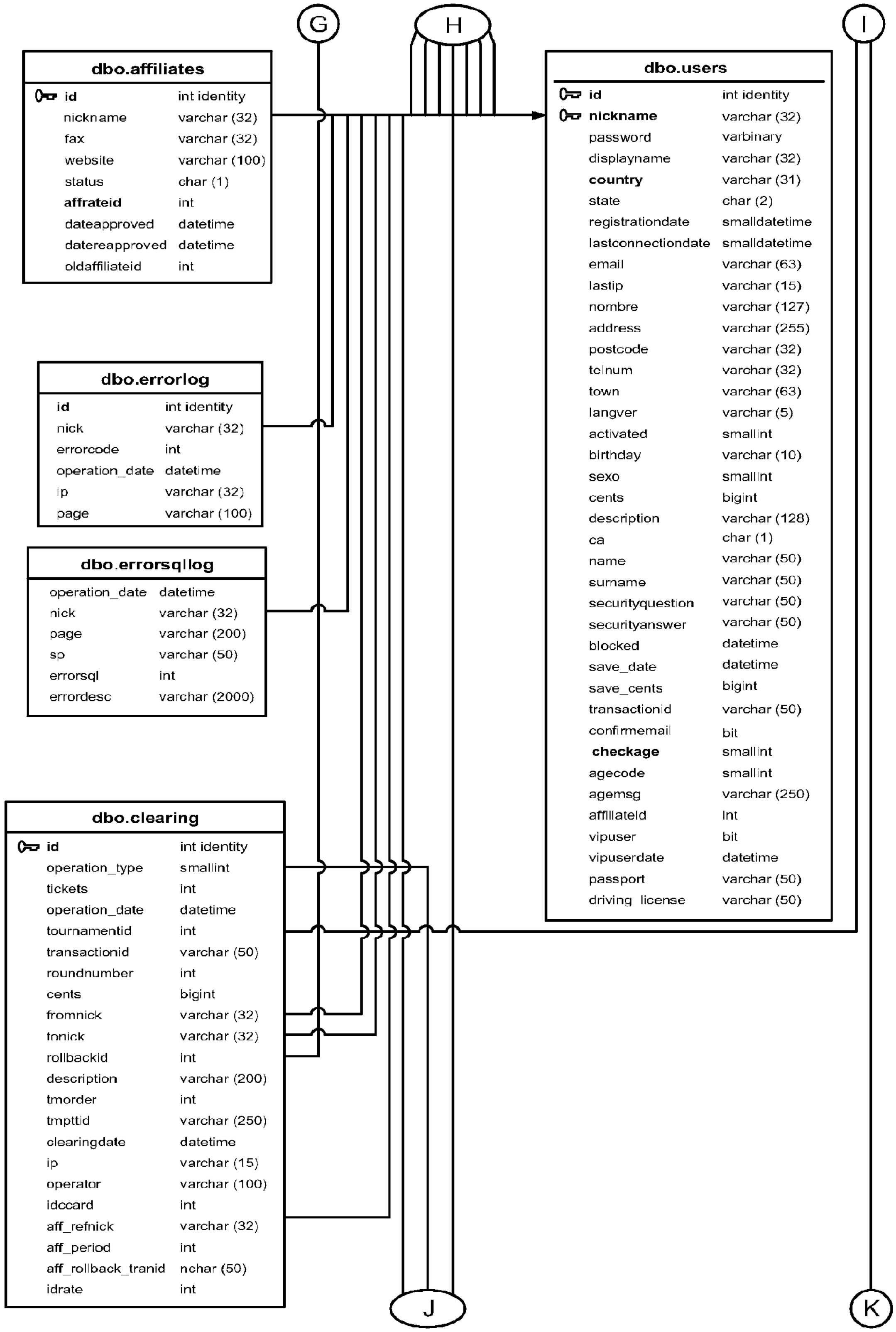
Figure 30E:
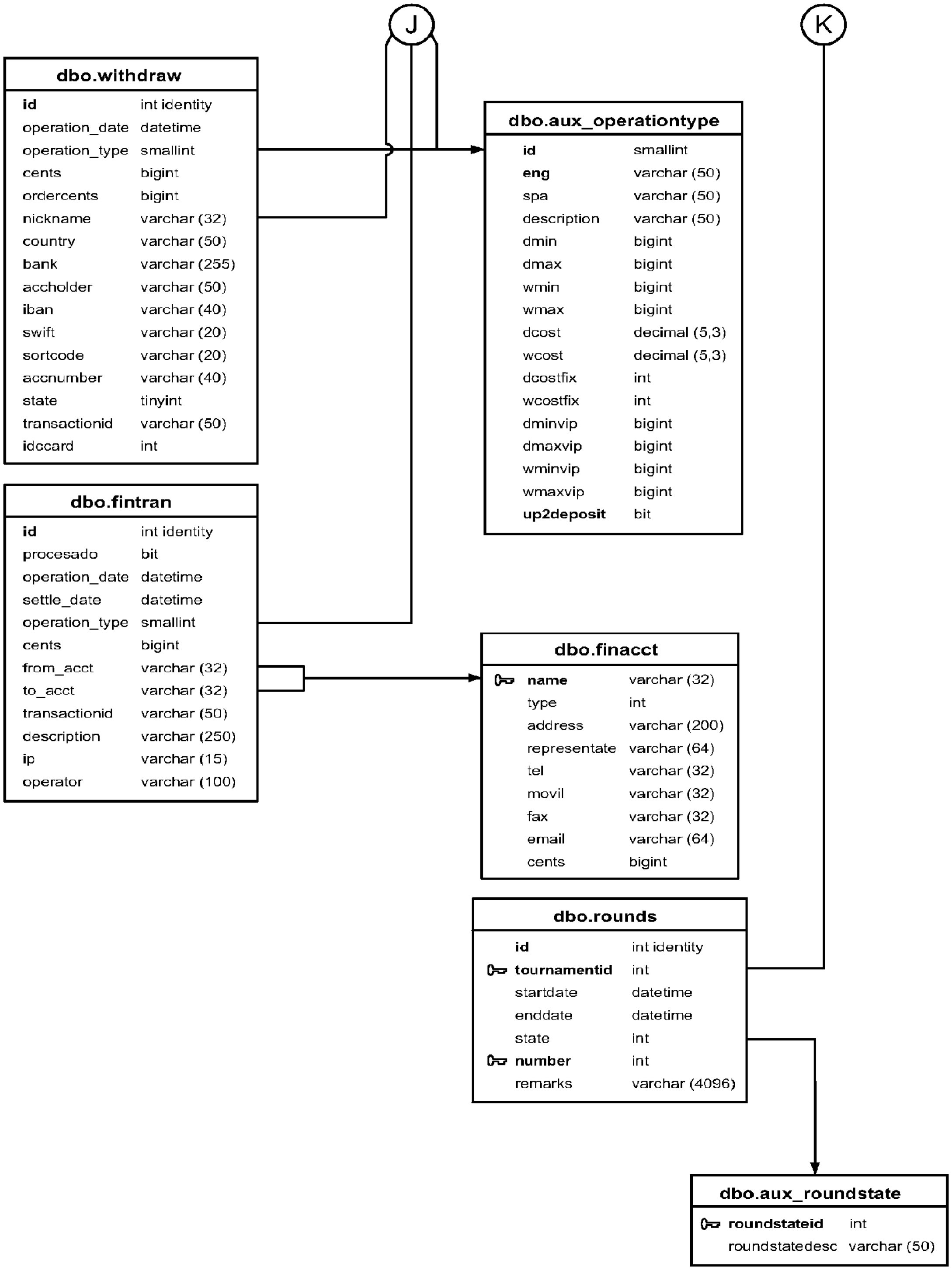
Figure 30F:
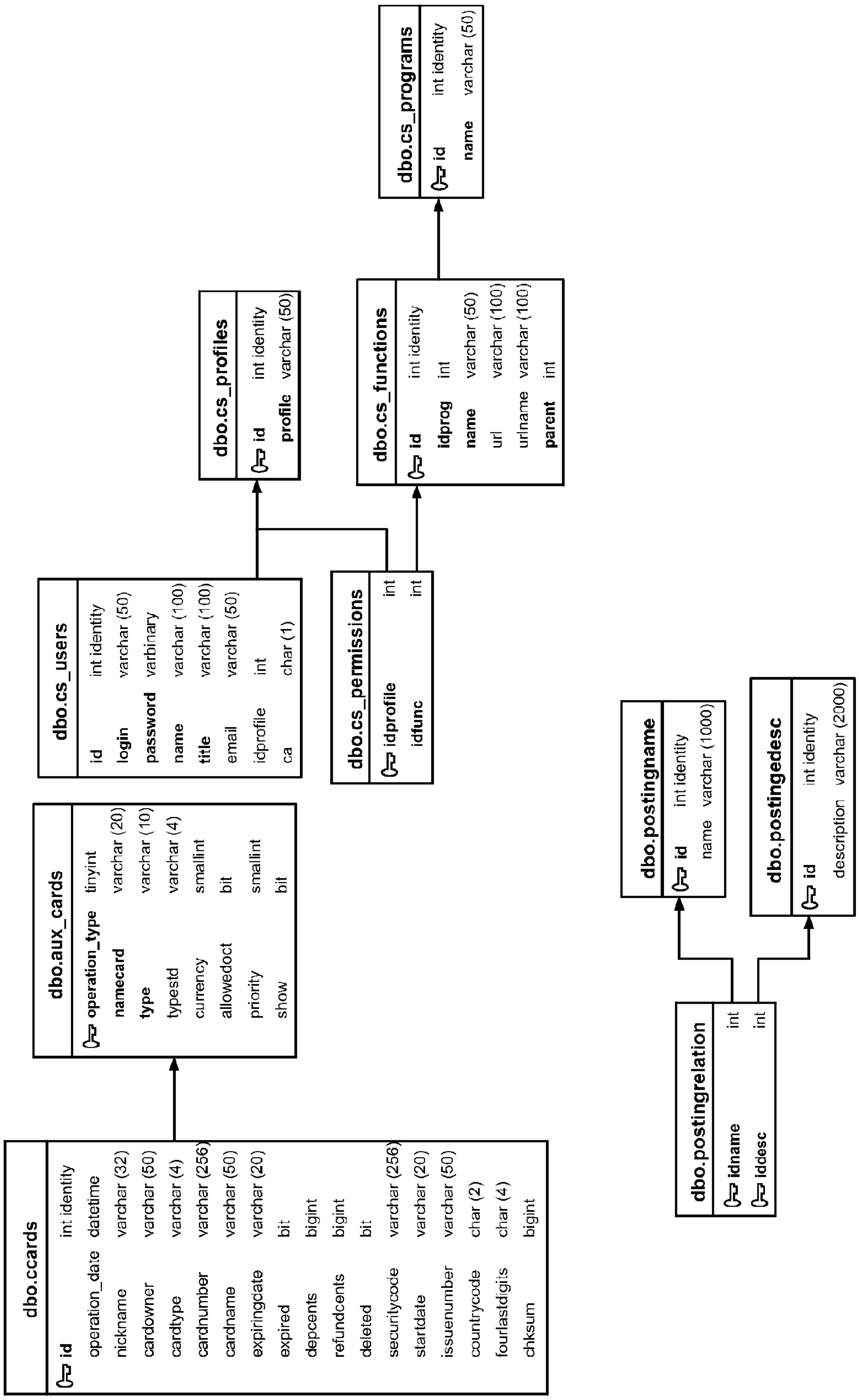
Figure 31A:
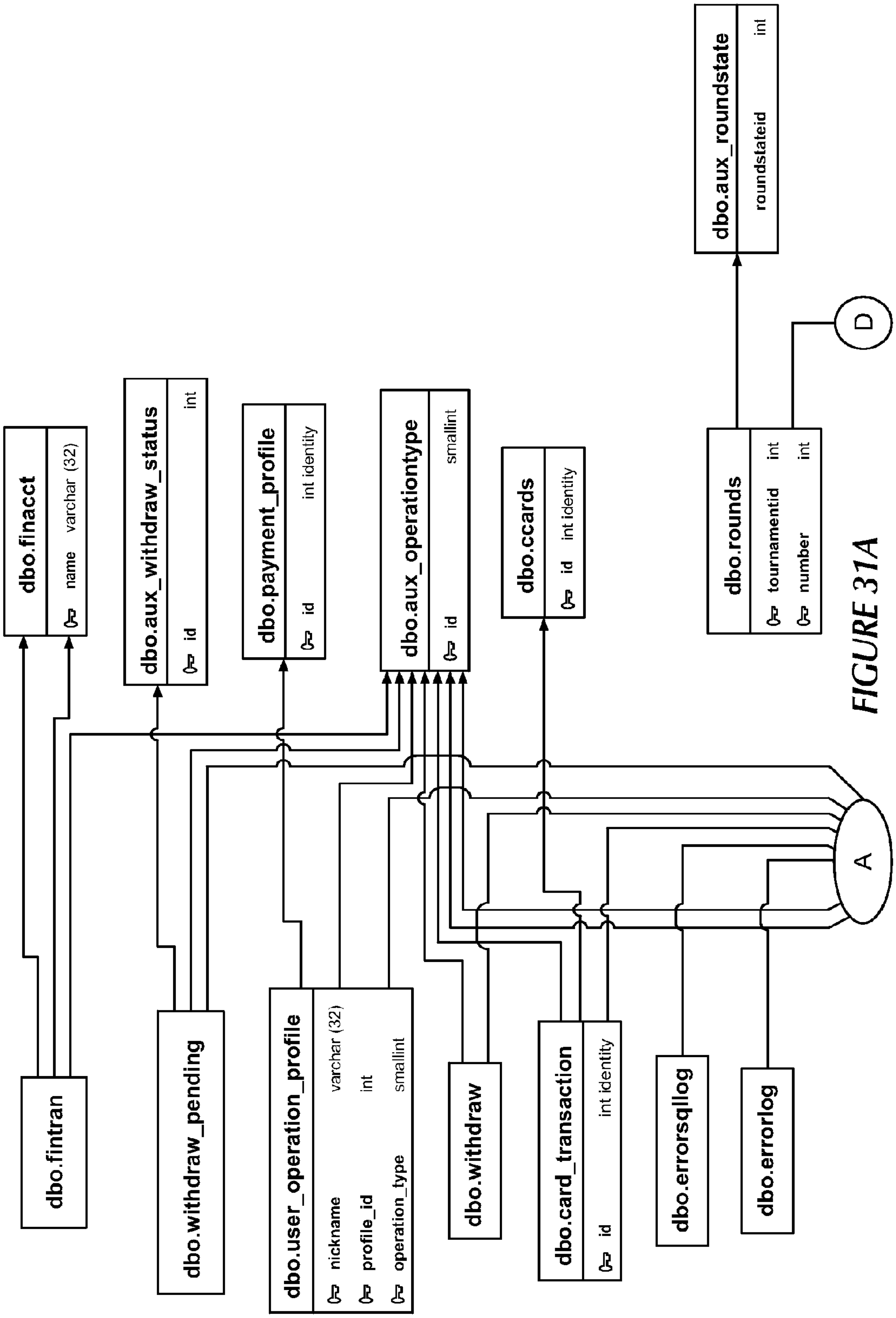
FIGS. 31A-31E, taken together, show additional database table relationships in accordance with one preferred embodiment of the present invention.
Figure 31B:
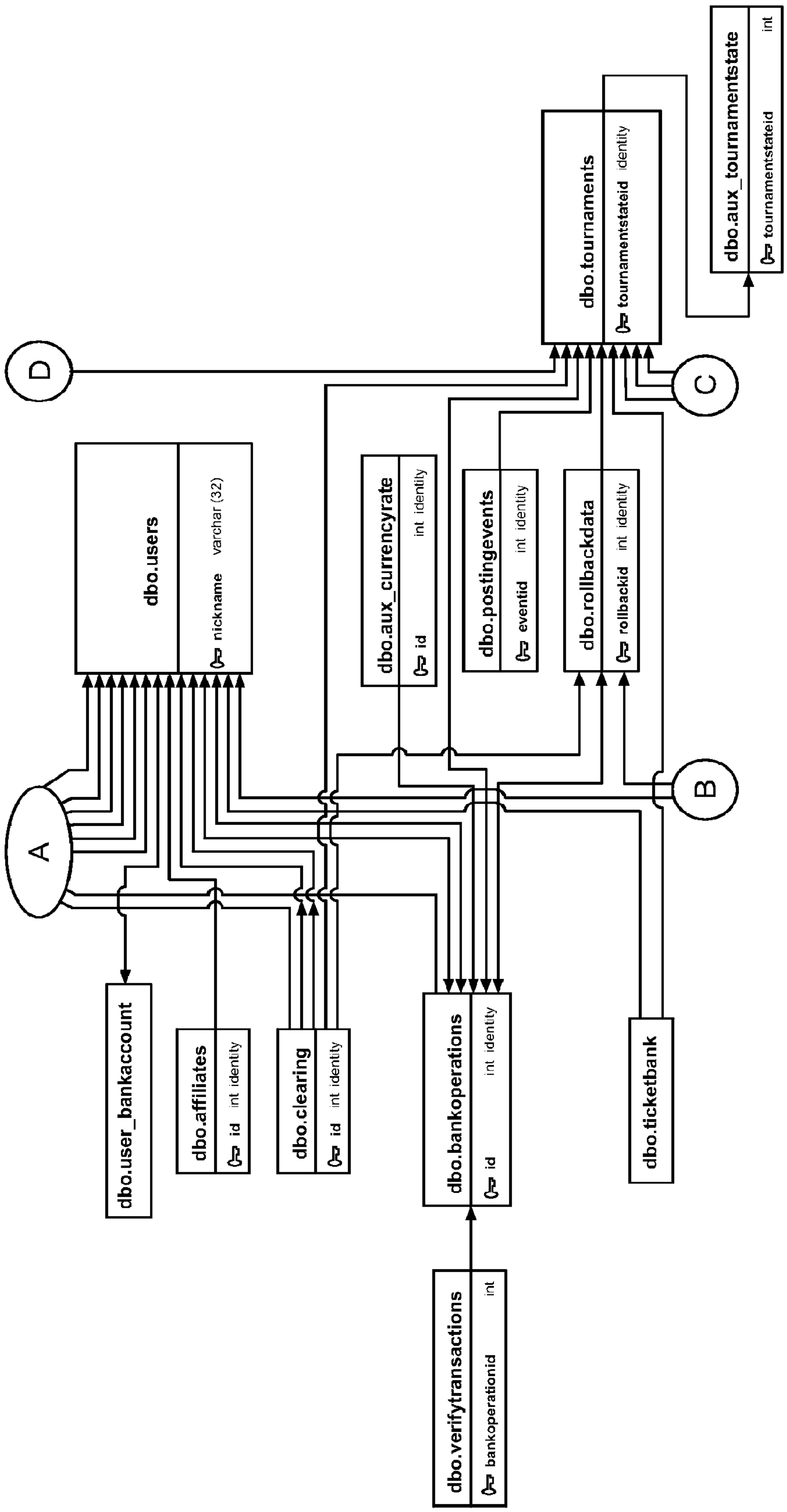
Figure 31C:
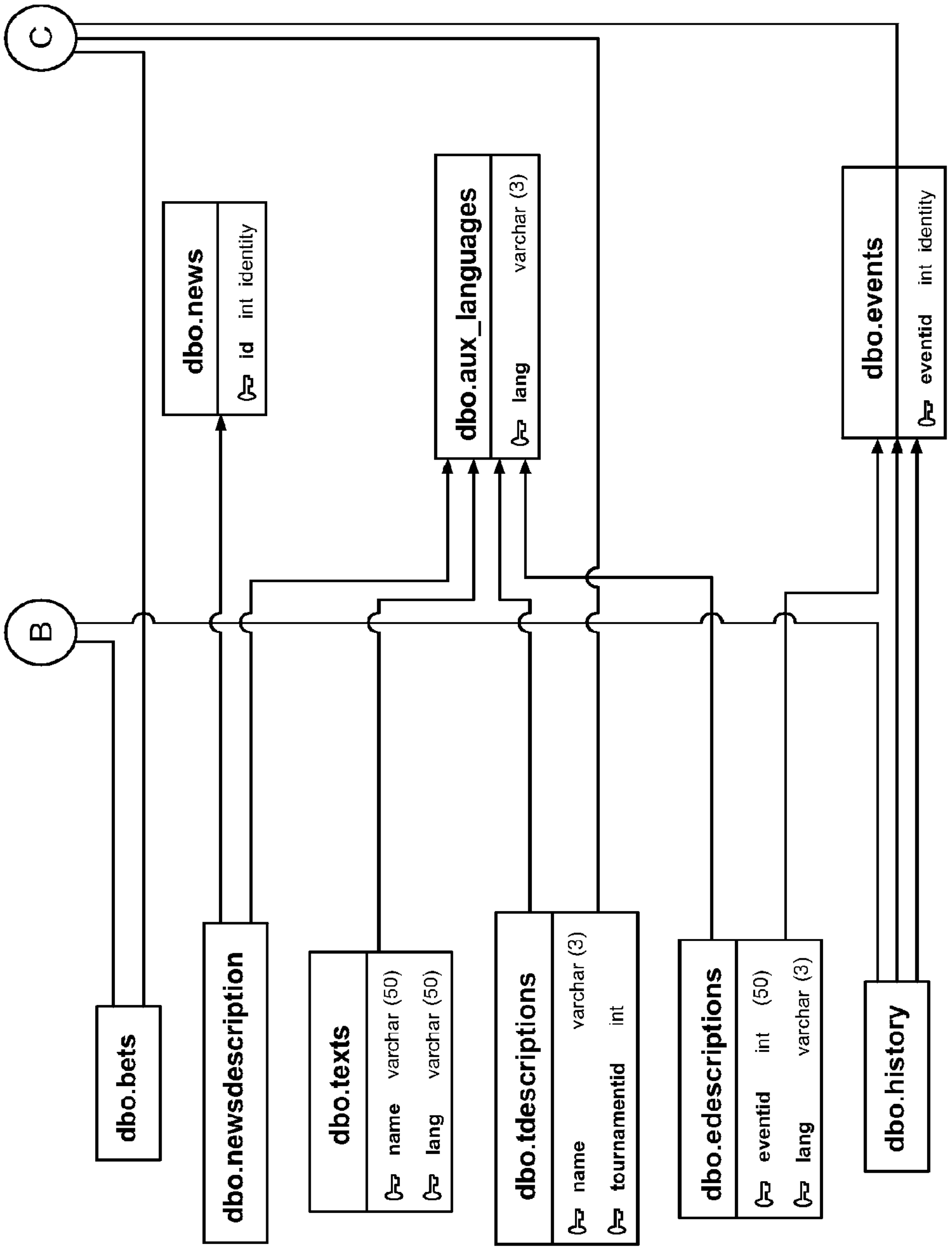
Figure 31D:
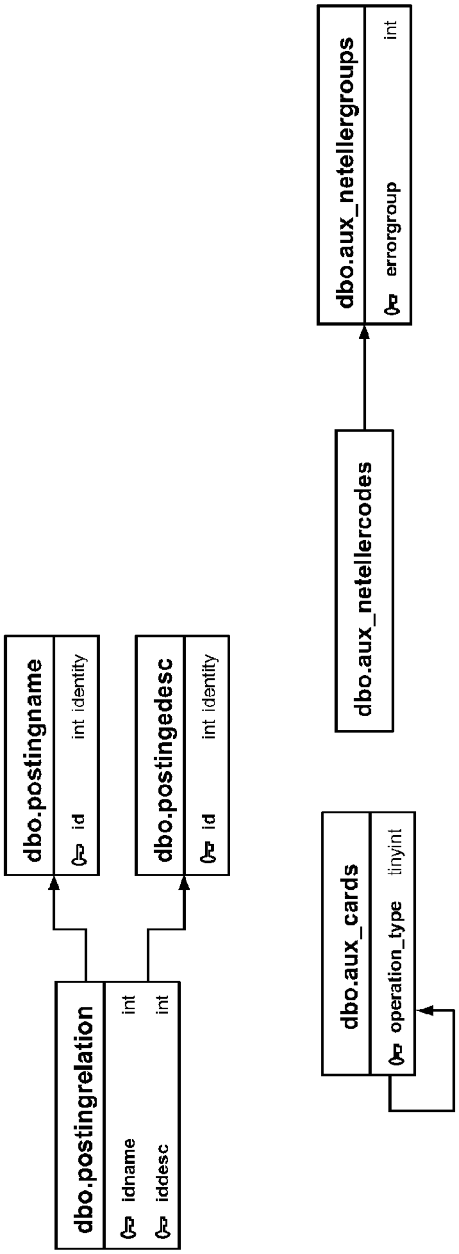
Figure 31E:
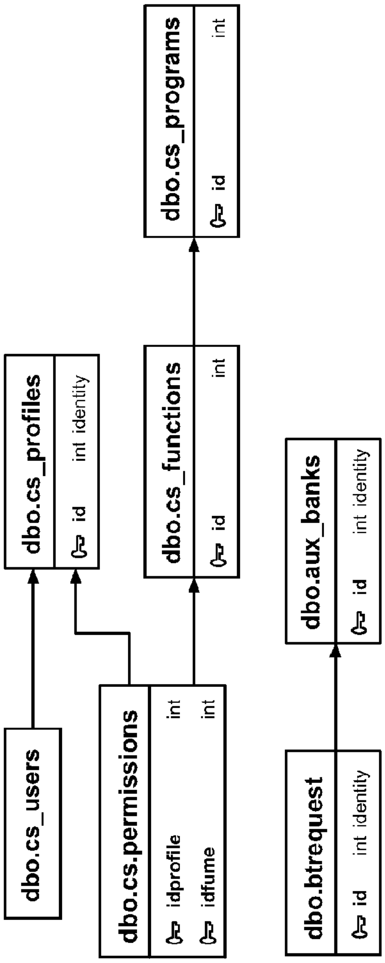

FIGS. 29A and 29B, taken together, show a self-explanatory flowchart detailing the process of the game, in accordance with one preferred embodiment of the present invention, including the hour of beginning (15:00 UT) and the hour when a contest ends, 48 hours later.

D. Database Structure

FIGS. 30A-30F, taken together, represent the complete structure of the Database with its tables, in accordance with one preferred embodiment of the present invention. As soon as the player plays, the system stores their winners in the databases dbo.bets and dbo.tournaments of FIG. 30C. All deals are stored in the database. dbo.verifytransactions and db.bankoperations FIG. 30C. All the tables used in WSC database are owned by the user dbo. FIGS. 31A-31E taken together, describe the relations between the tables. A complete list of tables is also provided in Table 1.

TABLE 1

List of tables

| TABLE_CAT | TABLE_SCHEM | TABLE_NAME | TABLE_TYPE | REMARKS |
|---|---|---|---|---|
| WSC XXXX | dbo | bankoperations | TABLE | (null) |
| WSC XXXX | dbo | bets | TABLE | (null) |
| WSC XXXX | dbo | challengehistory | TABLE | (null) |
| WSC XXXX | dbo | clearing | TABLE | (null) |
| WSC XXXX | dbo | edescriptions | TABLE | (null) |
| WSC XXXX | dbo | events | TABLE | (null) |
| WSC XXXX | dbo | history | TABLE | (null) |
| WSC XXXX | dbo | prizedistribution | TABLE | (null) |
| WSC XXXX | dbo | properties | TABLE | (null) |
| WSC XXXX | dbo | tdescriptions | TABLE | (null) |
| WSC XXXX | dbo | ticketbank | TABLE | (null) |
| WSC XXXX | dbo | tournaments | TABLE | (null) |
| WSC XXXX | dbo | users | TABLE | (null) |
| WSC XXXX | dbo | v_bankoperations | VIEW | (null) |
| WSC XXXX | dbo | v_bankoperations_clearing | VIEW | (null) |
| WSC XXXX | dbo | v_clearing | VIEW | (null) |
| WSC XXXX | dbo | v_events | VIEW | (null) |
| WSC XXXX | dbo | v_tournaments | VIEW | (null) |

E. Hardware/Software Architecture

Figure 32:
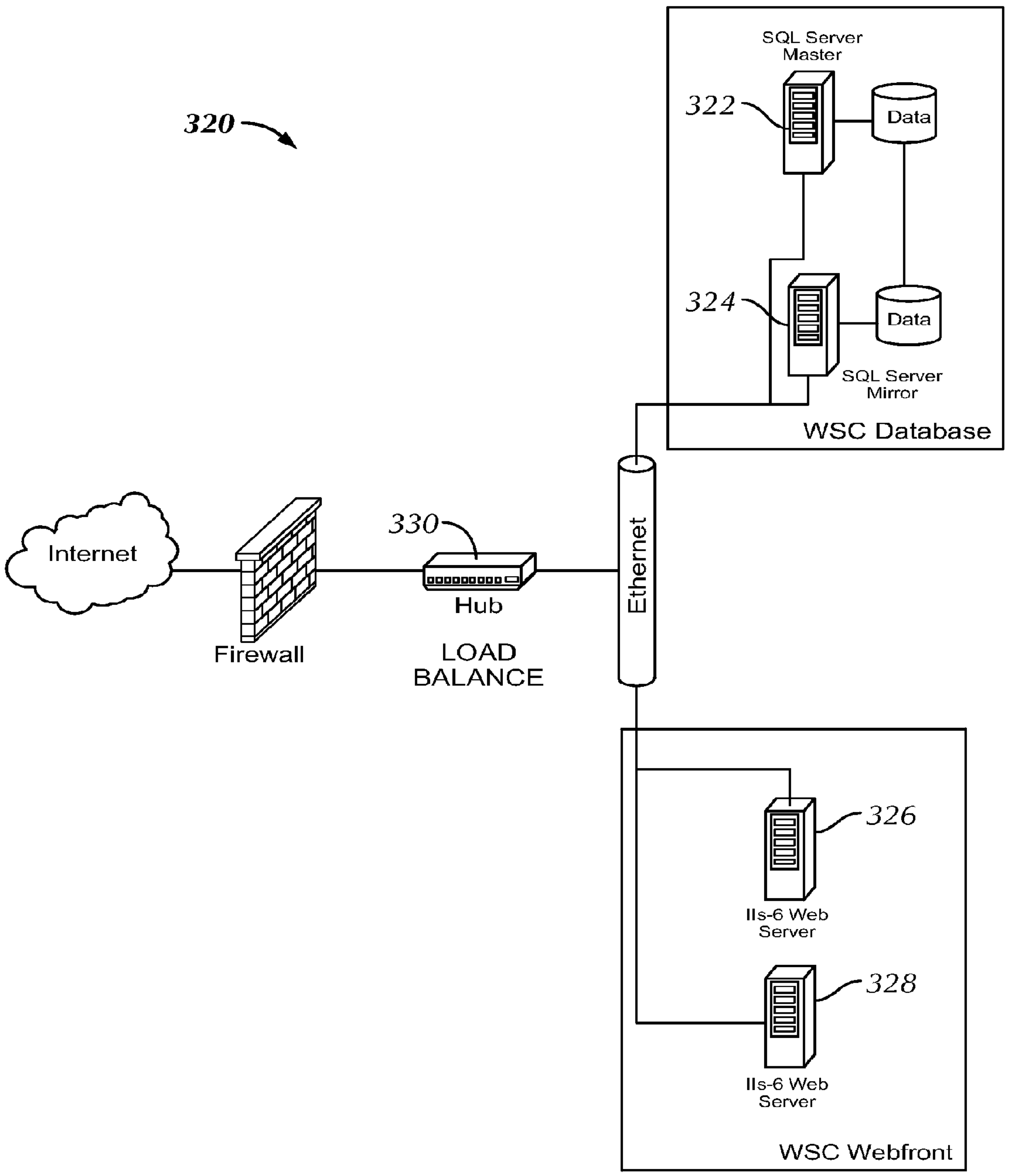
FIG. 32 shows a hardware and software architecture configuration in accordance with one preferred embodiment of the present invention.

FIG. 32 shows one suitable hardware and software architecture configuration 320 to execute the present invention. There are four Intel-servers (two SQL servers 322, 324 and two web servers 326, 328) with Microsoft Windows Server 2003 and one load balance 330 involved in the schema. The database version used in WSC is SQL Server 2005, which is mounted the two SQL servers 322, 324 using a mirroring configuration for safety reasons. If the master database falls down for any reason, the mirror database gains the control. Internet Information Server release 6 is mounted in the two web servers 326, 328. The load balance 330 distributes the load between the servers 322, 324, 326, 328. The players gain access to the application across these web servers.

F. Playing Rules: Definitions

[Available Funds] Those funds credited to your Player Account available to be used to purchase Tickets or to withdraw (not Reserve Funds) are Available Funds.

[Cancelled Game] A Game which:

(a) does not start; or (b) starts before the relevant Game Day or Game Week begins; or (c) ends after the relevant Game Day or Game Week finishes; or (d) does not have an Official Result by the end of the relevant Game Day or Game Week; or (e) starts without a participant who is named on the relevant Play Page.

[Challenge] A competition operated by WSC in accordance with the Challenge Rules.

[Challenge Rules] The rules published on the Website which govern how the Challenges operate—may be amended from time to time.

[Completed Game] means a Game which:

(a) begins during a Game Day or Game Week as appropriate;

(b) finishes with an Official Result at or before the end of the relevant Game Day or Game Week; and (c) is neither a Push Game nor a Drawn Game.

[Countdown Clock] The clock displayed on the home and Play Pages which indicates the time remaining to purchase and play Tickets in all Challenges which have a current Selection Day.

[Drawn Game] A Game that begins during a Game Day or Game Week as appropriate and finishes with a drawn or tied Official Result at or before the end of the relevant Game Day or Game Week.

[Game] Each athletic contest, match, race, or other competition selected by WSC for which Players must predict a winner.

[Game Day] means the 24-hour period starting at 15:00 UT at the end of the preceding Selection Day and ending at 15:00 UT the following day during which the four Games in a Set are scheduled to take place.

[Game Order] The order in which Games are scheduled for the purposes of a Challenge, as displayed on the Play Page. Game Order determines the order in which the Official Results of Games will be considered for the purposes of the advancement and elimination of Tickets. Game Order never changes, even if the Games actually start and/or finish in a different order.

[Game Split] The number of Tickets picking each side of a Game.

[Game Splits Chart] A chart which shows the Game Splits for a Set. For each Challenge, the Game Splits Chart will be posted on the Website shortly after 15:00 UT at the beginning of the relevant Game Day or Game Week.

[Game Week] In the context of a Special Challenge, this means the 6-day period starting at 15:00 UT at the end of the immediately preceding Selection Day and ending at 15:00 UT on the sixth day after the relevant Selection Day ended, during which the four Games in a Set are scheduled to take place.

[Live Ticket] A Ticket which has not been eliminated from a Challenge.

[Official Result] The last result of a Game, as determined by the governing body having jurisdiction over that Game, that is published at or before 15:00 UT at the end of the relevant Game Day or Game Week as appropriate and determines that the relevant Game has been won, lost, or drawn or tied. For the purposes of the Challenge, any subsequent change to the result as determined by the governing body, for example following an appeal procedure, shall not change the Official Result at 15:00 UT at the end of the relevant Game Day or Game Week.

[Place Prize] A prize awarded from the Prize Fund once the number of Live Tickets in a Challenge has dropped below twenty.

[Player] A person who registers as a Player on the Website and participates in one or more Challenges using a Player Account.

[Player Account] The customer account opened by WSC for each individual Player who registers on the Website to participate in Challenges.

[Play Page] The page on the Website where Players pick winners for the relevant Set in a Challenge, purchase Tickets, and play Live Tickets.

[Prize Fund] The pool of money from which Round Payouts and Place Prizes are awarded.

[Prize Fund Table] Each table on the Website that shows the scheduled distribution of a Challenge's total Round Payouts and twenty Place Prizes. The figures in each Prize Fund Table are not final until the end of that Challenge's first Selection Day.

[Push Game] A Game where all of the Live Tickets in a Challenge predict the same winner in an otherwise Completed Game.

[Random Pick] The allocation by the WSC computer of one of the sixteen possible combinations of picks for the relevant Set to a Live Ticket for which the Player for any reason has not made a selection by 15:00 UT at the end of a Selection Day. Each allocation is made separately.

[Red Zone] The period after the final Round Payout occurs, either as scheduled or because the number of Live Tickets has dropped to sixty or fewer.

[Reserve Funds] Funds credited to a Player Account but not yet available for the purchase of Tickets or for withdrawal.

[Round] A series of four Completed Games that is scheduled to end with a Round Payout.

[Round Marker] The yellow line that appears on the list of Games on the Play Page. It comes after the Game which would end a Round if all Games above the Round Marker became Completed Games.

[Round Payout] A prize awarded from the Prize Fund as a result of either a Round ending or the number of Live Tickets dropping to sixty or fewer prior to the end of the scheduled number of Rounds.

[Selection Day] The 24-hour period beginning (in the case of the first Selection Day of a Challenge) at 15:00 UT on the first day of the Challenge and (in the case of subsequent Selection Days) beginning at 15:00 UT at the end of the preceding Game Day (or, in the case of a Special Challenge, Game Week), and ending in each case at 15:00 UT the following day. During a Selection Day, Players may purchase Tickets or play their Live Tickets in continuing Challenges.

[Set] Each group of four Games posted by WSC at the start of a Selection Day in relation to which Players must select winners.

[Special Challenge] A Challenge with a six-day-long Game Week instead of single Game Days.

[Ticket] An entry in a Challenge. A Player may purchase more than one Ticket in a Challenge and may enter more than one Challenge. Tickets exist only virtually; Players will not receive a physical Ticket from WSC.

[UT] 'Universal Time', the official standard in worldwide timekeeping. UT will be used to refer to all WSC deadlines and other occurrences and is shown on the Website.

[Website] means the website with the uniform resource locator www.worldsportschallenge.com and used by WSC to promote and operate the Challenges.

[WSC] means World Sports Challenge Limited, a company registered under the laws of England and Wales.

[WSC Player Terms] The terms and conditions published on the Website which govern the relationship between WSC and Players.

G. Playing the Challenge: Rules and Prizes

In the text below, the items in brackets refer to the definitions above. The text that follows the words "Example" is spoken by an animated character on the website, referred to as the "Butler."

A. [Preparing to Enter a Challenge]

B. [Selection Day]

C. [Game Day—Game Week]

D. [Prizes]

A. Preparing to Enter a Challenge

Rule I: You must be verifiably at least eighteen (18) years old to register as a [Player] and play in [Challenges]. Check your local laws for any further restrictions.

1. You must:

(a) Register as a Player. Click on 'Register' in the left menu on any [WSC] page on the [Website].

(b) Read and agree to the [WSC Player Terms] on the 'Player Registration' page.

(c) Read and agree to the 'Privacy Policy' on the 'Player Registration' page.

(d) Deposit funds into your [Player Account].

(e) Wait for funds to clear at which point they will become [Available Funds]. You can check on this by clicking on 'Account Summary' in the 'Your Account' menu on the right-hand side of the screen.

2. Now you are ready to purchase [Tickets] and play in a Challenge!

In a Challenge, 24-hour [Selection Days] alternate with 24-hour [Game Days]. In a [Special Challenge], 24-hour Selection Days alternate with six-day [Game Weeks]. The start and finish time of all Selection Days, Game Days, and Game Weeks is 15:00 [UT].

B. Selection Day

1. To purchase Tickets:

(a) Log in and click on 'Challenge' or (when available) 'Special Challenge', which appear in yellow in the left menu. This will take you to the relevant [Play Page].

(b) Make your predictions for each of the four [Games] in the [Set] by clicking on the circle by the side of your chosen winner. Home teams (if any) are marked with an asterisk (*).

(c) Enter the number of Tickets you wish to purchase for your predicted winners of the four Games and then click on the 'Play' button. A confirmation screen will appear.

(d) If the information is correct, click on 'OK'. If the information is incorrect or if you change your mind, click on 'Cancel' and begin the process again.

Rule II: Once you click on 'OK', you cannot change your selection or withdraw from the Challenge. Check your selection carefully!

(e) After you click on 'OK', your Ticket will be displayed. If you would like to purchase more Tickets, perhaps with a different combination of predictions, click on 'Continue' and repeat steps (b), (c), and (d) above. If you would like to exit, click on an item in the left menu.

2. To play [Live Tickets] in a Challenge you have previously entered:

(a) Log in and click on 'Your Challenges', which appears in red in the left menu whenever you have Live Tickets. A list of all the Challenges and Special Challenges in which you have any Live Tickets will be displayed.

(b) Click on a Challenge that is currently in its Selection Day or on the red number after 'Tickets not played yet' to reach the relevant Play Page.

(c) Make your predictions, enter the number of Live Tickets that you wish to play, click on 'Play' and confirm your selection, if it is correct.

(d) If you have any Live Tickets still to play, click on 'Continue' and proceed as before.

3. Unless you checked the box requesting us not to send confirmation emails, WSC will immediately send you an email confirming each of your selections. If you do not receive such an email (perhaps owing to a delivery failure), please go to that Challenge's Play Page and click on 'Selected Tickets' to check that your selections appear there. Your Tickets into a Challenge and Selection Day picks are immediately recorded, so in the unlikely event that any Ticket or selection does not appear, it should be re-entered. [Example Imagine this: there you are, seated happily at your computer, busily entering the picks for your Live Tickets or purchasing new Tickets for Today's Challenge. Just as you click "Confirm," the confounded lights flicker as a power surge knocks you offline. Once you re-boot, you should check your email or your World Sports Challenge account to double-check on your selections. Since selections for Live and new Tickets are immediately posted to your account, if they do not appear there, then you may safely re-enter your selections for Live Tickets or attempt again to purchase tickets, confident that you are not buying duplicates.]

Reminder: Whenever you have a Live Ticket at the end of a Challenge's Game Day or Game Week, you will need to predict winners for the next Set in that Challenge on its upcoming Selection Day by following the procedure described in 2. above.

4. If you do not predict winners for any or all of your Live Tickets during a Challenge's Selection Day, WSC will generate automated [Random Picks] for each Live Ticket. An email will be sent to you informing you of this. You may also want to go to the Website and click on 'Your Challenges' and then click on that Challenge or Special Challenge to see your Live Ticket picks, which are shown in red on the [Game Splits Chart]. [Example What if you cannot get online to make your picks or forget to make them? Mustn't fret about losing out because your connection to the Internet took a holiday or you had to stay late at work and missed the deadline. In that case, you do NOT automatically lose. Rather, if you do not post your picks by the deadline, the WSC computer will randomly choose a side for you—flip a coin, as the Americans say. If you hold more than one ticket, the computer will assign each ticket a random set of picks. Just as when you make your own picks, the WSC will send an email informing you that the computer has assigned picks to your tickets if you checked the box requesting notification emails. If you choose not to receive notifications, you should visit the WSC website to check on your selections. Mustn't forget: if you do not post your picks by the deadline, your choices will be made by the computer.]

5. The [Countdown Clock], which usually appears in green on the home page and Play Page, indicates the time remaining in the relevant Challenge's Selection Day. During the final hour of a Selection Day the Countdown Clock appears in red.

C. Game Day—Game Week

Game Day or Game Week is the time during which the relevant Set of Games is scheduled to take place. During this period you wait to see if your Tickets advance or are eliminated. You do not have to take any action during this part of any particular Challenge.

1. Once Game Day or Game Week begins, WSC will automatically generate the Game Splits Chart for the relevant Set. These charts can be accessed by going to 'Your Challenges' in the left menu and clicking on the relevant Challenge. On this chart you can see the [Game Splits] for that Set. Game Splits Charts show your Ticket picks in red and the total number of Ticket picks in bold black.

2. WSC officially defines the outcome of all Games as one of the following:

(a) [Completed Game] This is a Game which:

(i) begins during a Game Day or Game Week as appropriate;

(ii) finishes with an [Official Result] at or before the end of the relevant Game Day or Game Week; and (iii) is neither a Push Game nor a Drawn Game.

It includes a Game that begins during the Game Day or Game Week, but ends with an injury default [Example Fedick and Roderer begin their match. Fedick leads 5-2 but hurts his leg and cannot continue. Roderer wins, huzzah! Since the game began before the default, the lads will consider this a Completed Game with Roderer the winner.] or a Game that was drawn or tied at the end of regulation play but had a winner after the application of an official tie-breaking process such as overtime, sudden death, or shootout. [Example Let us suppose that the Cincinnati Ravens are playing the New York Broncos in the America's NFL in a regular season game. The score is tied 14-14 at the end of the fourth quarter. The match moves into sudden death overtime, as laid down by the rules of the NFL. The Cincinnati Ravens score a touchdown to win. The Official Result of the Game is a Cincinnati Ravens win. On the other hand, if neither team had scored during the overtime period, the Official Result (following the rules of the NFL) is a tie or Draw.

(b) [Drawn Game] This is a Game which begins during a Game Day or Game Week as appropriate and finishes with a drawn or tied Official Result at or before the end of the relevant Game Day or Game Week. It includes a Game that was drawn or tied at the end of regulation play and remained drawn or tied after the application of an official tie-breaking process such as overtime, sudden death, or shootout.

(c) [Cancelled Game] This is a Game which:

(i) does not start; or (ii) starts before the relevant Game Day or Game Week begins; or (iii) ends after the relevant Game Day or Game Week finishes; or (iv) does not have an Official Result by the end of the relevant Game Day or Game Week; or (v) starts without a participant who is named on the relevant Play Page.

It includes a Game that did not start owing to an injury forfeit. [Example A basketball game between Spain and Lithuania is postponed past the 1500 UT deadline. Regardless of the reason for the cancellation—weather, injury, illness—the Game does not count in the Challenge.] A Game scheduled to involve several individual competitors posted in the form 'X, Y, and Z versus the rest of the field' where any of X, Y, or Z does not in fact begin the Game would also constitute a Cancelled Game. [Example For instance, take a Game posted in this form: Tiger Els, Ernie Woods, and Thomas Henry Mann versus the rest of the field in the British Open. If poor Tiger oversleeps and misses his tee-time—no, not THAT sort of teatime; the sort one has at a golf tournament—then the Game is Cancelled even though Ernie and Thomas DID show up and play.]

(d) [Push Game] This is a Game where all of the Live Tickets in a Challenge predict the same winner in an otherwise Completed Game.

Rule III: Tickets advance to the next Game in the [Game Order] of the relevant Challenge if the Player has correctly predicted the winner of a Completed Game. Tickets are eliminated from a Challenge when the Player has not correctly predicted the winner of a Completed Game.

Rule IV: When a Drawn, Cancelled, or Push Game occurs, all Tickets remain Live Tickets and advance to the next Game in the Game Order.

Rule V: WSC considers the Official Result of a Game as at 15:00 UT at the end of the relevant Game Day or Game Week to be final for that Challenge. Results overturned on rulings or appeals determined by the governing body of that sport AFTER 15:00 UT at the end of the Game Day or Game Week will not change the result of the Game for the purposes of that Challenge.

[Example Madrid United defeats Real Manchester in a closely-contested and controversial match. Manchester appeals the game to FIFA, but that appeal will not be heard until next week. For now, the result is considered final, and since it will be final at 1500 UT, Madrid is considered the winner for the Challenge, and those tickets picking Madrid as the winner will advance to the next Game, while those picking Manchester will be eliminated.]

Rule VI: Where two or more events, contests, or matches are used to determine the qualification of a team or individual for a later stage of a competition and the final match of that qualifying process is selected as a Game, that Game will be considered as a single match. Only if the Game itself is drawn or tied will any official tie-breaking procedure which comes into effect be considered as part of THIS Game. [Example 1. Imagine that Birmingham Villa opposes Real Milan in the knockout stages of the UEFA Cup. These matches are played in two separate games, here called 'legs'. Birmingham Villa wins the first leg two-nil. Real Milan leads the second leg two-nil after the scheduled 90 minutes of play. Under UEFA Rules, the match will move into extra time to determine who will qualify for the next round of the competition, as the aggregate scores—the combined scores of both legs—are level at two-two. However, since the second leg was not ITSELF a Draw, the Official Decisive Result of this Game is a Real Milan win regardless of the outcome of the extra time. 2. Now suppose that Dynamo Liverpool plays Spartak Madrid in the knockout stages of the Champions' League. The matches are played over 2 legs. The score is a one-one Draw in the first leg. The score in the second leg is also one-one after the scheduled 90 minutes of play. Under UEFA Rules, the match will move into extra time to determine who will qualify for the next round of the competition, as the aggregate scores are level at two-two. As the second leg was ITSELF a Draw, UEFA's tie-breaking procedures come into play. The Official Decisive Result of the Game will be determined by the winner after Extra Time or Penalty Kicks. Note: Although the "Away Goals Rule" is an official tie-breaking procedure, if its use requires any goals scored in a previous match to be taken into account, WSC will disregard that as a tie-breaking procedure for the purposes of deciding the result of THIS Challenge Game. 3. Finally, consider this case: Deportivo Seville plays Munich City in the knockout stages of the Champions' League. As noted, the matches are played over 2 legs. The score is a one-one Draw in the first leg which was played at Seville. The score in the second leg, played in Munich, is also one-one after the scheduled 90 minutes of play. Under UEFA Rules, the match will move into extra time to determine who will qualify for the next round of the competition, as the aggregate scores are level at two-two. During extra time, both teams score one further Goal. Under UEFA Rules, Seville will qualify as they have scored two goals away from Home compared to Munich's one. However, for WSC purposes, the Official Result of the Challenge Game will be a three-three Draw.]

Rule VII: The results of Games will always be considered in Game Order. Even if a Game listed later in the Game Order starts and/or finishes sooner than a Game listed before it in the Game Order, the one listed earlier will always be considered first for the advancement and elimination of Tickets. [Example Two events on Game Day are American football games, the first between New York and Washington and the second between Seattle and St. Louis. The New York-Washington game began first, but it goes into overtime and eventually ends with a New York victory thirty minutes AFTER Seattle defeated St. Louis. This does NOT change the Game Order. At the end of the Game Day, those who chose Washington in the first Game are eliminated before those who projected St. Louis as the winner in the second Game—even if the Players who chose Washington had also chosen Seattle as the winner.]

3. WSC uses the following procedure to advance and eliminate Tickets for every Game in a Challenge:
   (a) A Game is identified as a Completed, Drawn, Cancelled, or Push Game.
   (b) If the Game is identified as a Completed Game, then only the Tickets that correctly predicted the winner of the Game advance to the next Game of the Game Order. All Tickets picking the wrong winner are eliminated.
   (c) If the Game is identified as a Drawn, Cancelled, or Push Game, then all Tickets advance to the next Game in the Game Order.
   (d) The Challenge then moves to the next Game in the Game Order and repeats steps (a), (b), and (c) above.

Note: The Tickets being considered for advancement and elimination at all points in a Challenge's Game Order are the Live Tickets, that is, those Tickets where the Player has correctly predicted the winner of all previously Completed Games in the Challenge. To see examples of how Tickets advance or are eliminated, click on 'Past Challenges' in the left menu.

D. Prizes

1. When a Player buys a Ticket for 5.50 Euros, 5 Euros go directly to the [Prize Fund] for that Challenge. Therefore, the total Prize Fund for that Challenge is the number of Tickets multiplied by 5 Euros.
2. 100% of the Prize Fund will be paid out as [Round Payouts] and [Place Prizes] to Players holding winning Tickets in the relevant Challenge.
3. Each Challenge has a [Prize Fund Table] which can be accessed by clicking on the Euro amount shown beside 'Prize Fund'. Although the Prize Fund Table can be accessed from the beginning of a Challenge's first Selection Day, its figures are not final until the start of its first Game Day or Game Week. [Example Here is a sample Prize Fund for a Challenge with a million entries and a 5 million Euro Prize Fund. What a pleasant thought!]
4. Round Payouts are earned by Live Tickets. Each Live Ticket remaining after the end of each [Round] earns an equal share of the total Round Payout for that Round. [Example If 50 Live Tickets remain to share the Round 3 prize when the Round ends, each Ticket earns 1/50 of that Round Prize. If a player holds two of those Live Tickets, the Player would receive 2 shares (2/50); if a Player holds three, the Player would receive 3 shares (3/50), and so on.]
5. A Player may win more than one Round Payout by holding more than one Live Ticket at the end of a Round and may win more than one Place Prize by holding more than one Ticket among the Tickets winning the twenty Place Prizes. [Example Suppose that a player holds three Live Tickets at the end of a Round. At that time, the player will receive one share of the Round Prize for every Live Ticket held. Those same Tickets could go on to win additional Round and Place prizes.]
6. Round Payouts and Place Prizes are awarded on a pay-as-we-go basis. If a Player earns a Round Payout or Place Prize, that prize will be awarded shortly after 15:00 UT on the day it was won rather than at the end of the Challenge.
7. Round Payouts are awarded ordinarily after four Completed Games. The yellow [Round Marker] will show the anticipated end of the current Round. [Example The Round Marker shows the anticipated end of a Round. However, if Games are Cancelled or Pushed, then the Round Marker will move down one Game for each Cancelled or Pushed Game.] However, since Drawn, Cancelled, and Push Games do not count towards the completion of a Round, some Rounds may extend over more than one Game Day or Game Week. [Example Four Games are slated for each Game Day. Suppose that one Game is cancelled. In the next Game, every Live Ticket picks the same team to win. In this case, only two games from that Game Day count towards the Round, so two more Complete Games are still needed to finish the Round. The Round Marker moves ahead to mark the new projected end of the Round. On the second Game Day, the first two Games are completed as scheduled. Since that makes four Complete Games, the Challenge Round 1 prizes are now awarded, with one share of the prize for every Live Ticket.]

Rule VIII: Only Completed Games make up a Round. [Example Each Selection Day, including the first, the lads post four Games. If all four Games on the first day were completed, then the first Round Prize would be awarded. However, if one baseball game is delayed past 1500 UT because of snow in New York, then only the three Completed Games count towards the Round Prize.]

Rule IX: When the number of Live Tickets remaining in a Challenge drops to sixty or fewer, then the current Round ends immediately. Round Payouts with respect of the current Round and any other Rounds that are scheduled for that Challenge will be shared equally among the remaining Live Tickets. [Example Suppose that a Challenge has three scheduled Rounds, but only two have been completed. After the third Game in Round 3 ends, only 50 Live Tickets remain. At this moment, the current Round ends because the number of Live Tickets fell below 60 and the Challenge enters the Red Zone. The holders of the remaining Live Tickets will receive $1/50^{th}$ of the Round Three prize for each Live Ticket held.]

8. When there are sixty or fewer Live Tickets remaining in a Challenge or the final scheduled Round Payout has been awarded, the Challenge enters the [Red Zone]. Entering the Red Zone may therefore result in a Round shorter than four Completed Games. In the Red Zone, the background on the Play Page turns red to alert the Players that they have entered the final stage of the Challenge where they are now competing for the top twenty Place Prizes. [Example The "Red Zone" means the final battle for the prizes. When the final scheduled Round is over including a situation when the number of Live Tickets falls to sixty or below during a Round, thus creating a shortened Round, the Challenge enters the Red Zone where the Players face off for the top twenty prizes. When the background turns red, you have entered the Red Zone!]
9. When the result of a Completed Game drops the number of Live Tickets below twenty, Players will begin receiving Place Prizes. The holders of the Tickets eliminated by the Completed Game will receive an equal share of the relevant Place Prize(s) which became payable as a result of their elimination. [Example When in the Red Zone, should the number of winning tickets fall below twenty, the prizes up to twentieth place will be divided among the last tickets eliminated. For example, if the number of winning tickets falls from forty to fifteen after a given Game, then 16th-20th prizes will be divided equally among the last twenty-five Players or Tickets eliminated.]

Rule X: The Challenge ends when only one Live Ticket remains, one Player holds all of the remaining Live Tickets, or when four Push Games occur without an intervening Completed Game. [Example As Game Day begins, only three Tickets remain Live in the Challenge. The Tickets have all chosen the same side of Game 1, which is a Competed Game: Push. The Tickets have all chosen the same side of Game 2, another Completed Game: Push. The same side on Game 3, yet another Completed Game: push. The same on Game 4: Push. After the 4th Push, the clever chaps here at the World Sports Challenge decree that the Challenge immediately ends. The top three prizes go into a single pot and the last three Live Tickets each receive an equal share of the total of the first, second, and third prizes. For example, if one player holds two tickets and another player holds one, after four consecutive pushes, the players would divide the prizes for 1st, 2nd, and 3rd. The player with two tickets would receive two-thirds of the total and the player with one ticket would receive one-third of the total. Just a moment—what if the series of four Pushes had been interrupted by a Cancelled Game, thusly: Push. Push. Cancelled Game. Push. Push. Quite elementary! Because Cancelled Games do not count toward the Challenge in any way, the Cancelled Game does not affect the series of four Pushes and the Challenge ends.]

10. If a Challenge is ended by four Push Games occurring without an intervening Completed Game, any remaining Round Payouts or Place Prizes will be divided equally between the remaining Live Tickets.
11. All Round Payouts or Place Prizes awarded and credited to your Player Account become Available Funds at approximately 21:00 UT, roughly six hours after the Game Day or Game Week results become final. Until that point they remain [Reserve Funds]. [Example When a Player wins a prize, the money for the prize will be added to the Player's account shortly after 1500 UT when the results become final. Six hours later, at approximately 2100 UT, the funds will move to the "Available Funds" column.]

Note: To see examples of the distribution of a Prize Fund, click on 'Past Challenges' in the left menu, then click on a Challenge followed by clicking on Tee'.

Contingency Rule

Rule XI: Should any circumstance or set of circumstances arise not covered by these Rules, the situation will be resolved at the discretion of the World Sports Challenge staff.

H. User Interface Display Screens

FIGS. 1-23 show user interface display screens for a Player participating in Challenge 017 of a WSC tournament in accordance with one preferred embodiment of the present invention.

Figure 1:
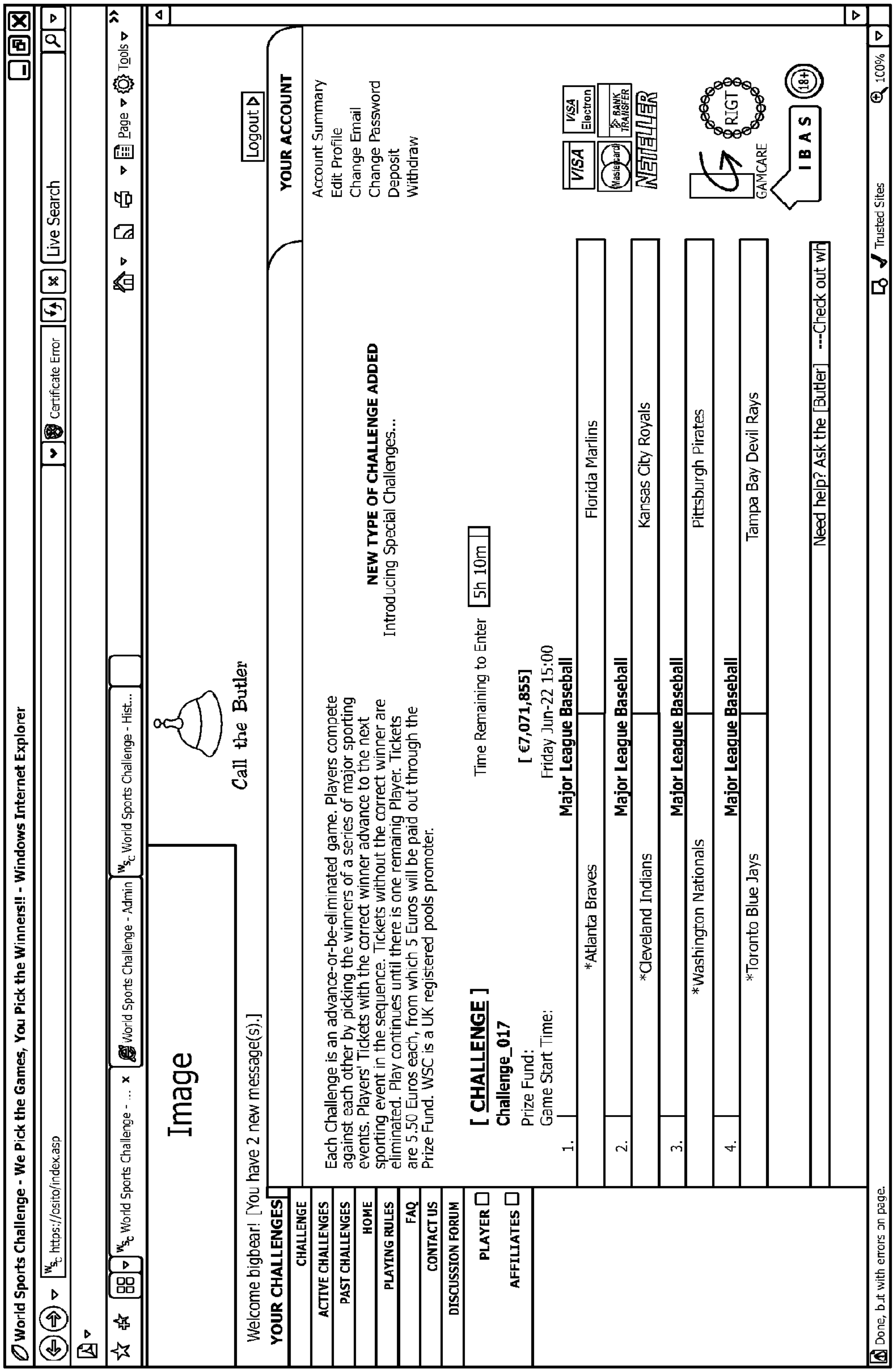
FIGS. 1-24 are user interface display screens in accordance with preferred embodiments of the present invention.

FIG. 1: Player navigates to the website, logs in with a user name and password, and arrives at the home page. The website shows that Challenge 017 is available for play. The Player clicks on the menu option, "Challenge" and is brought to a Play Page (FIG. 2).

Figure 2:
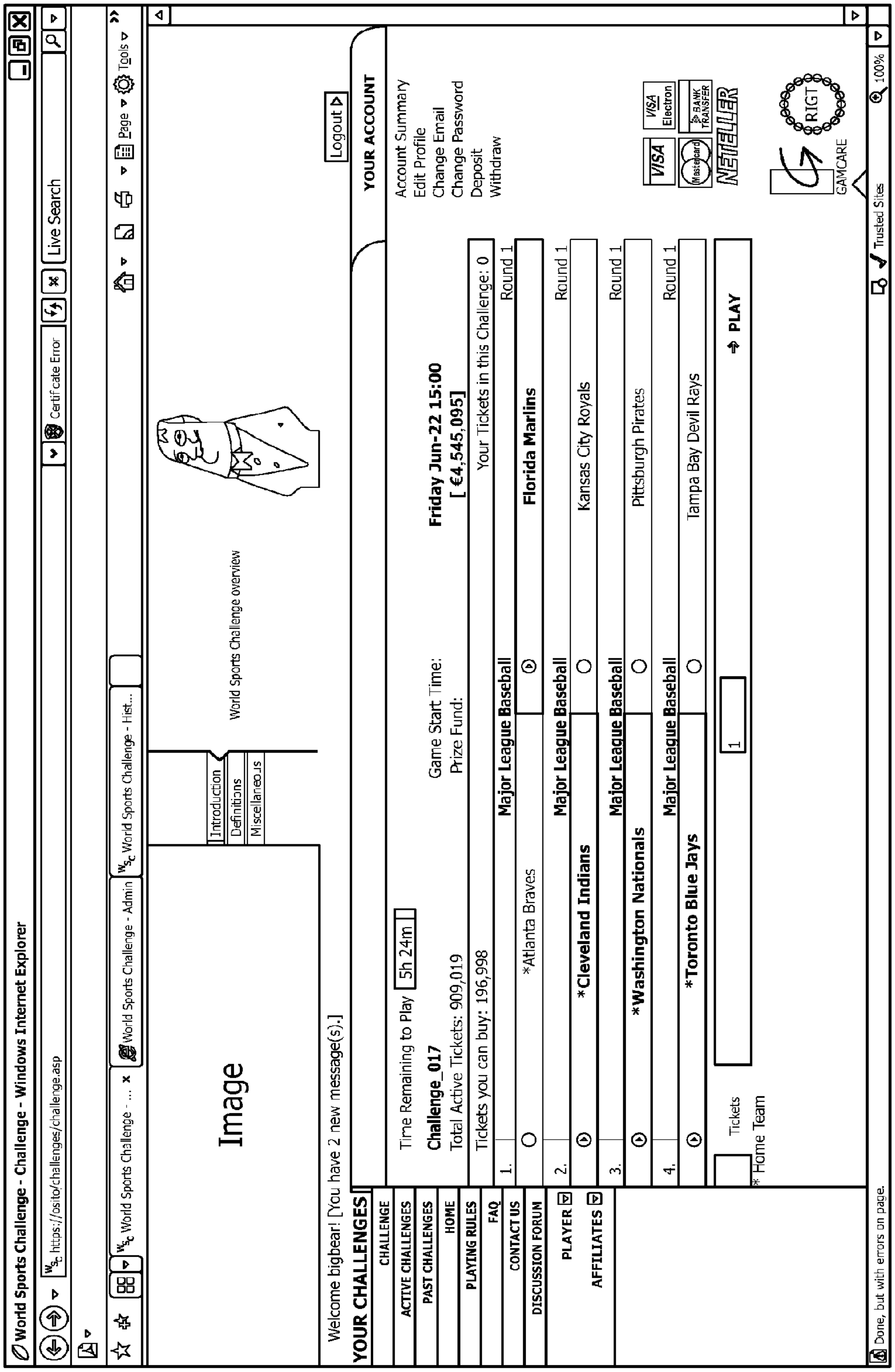

FIG. 2: Player clicks on radio buttons to pick four winners, selects the number of tickets for that combination of winners (here, the player selected "1" ticket), and then clicks on the "Play" button which brings up a confirmation page (FIG. 3).

Figure 3:
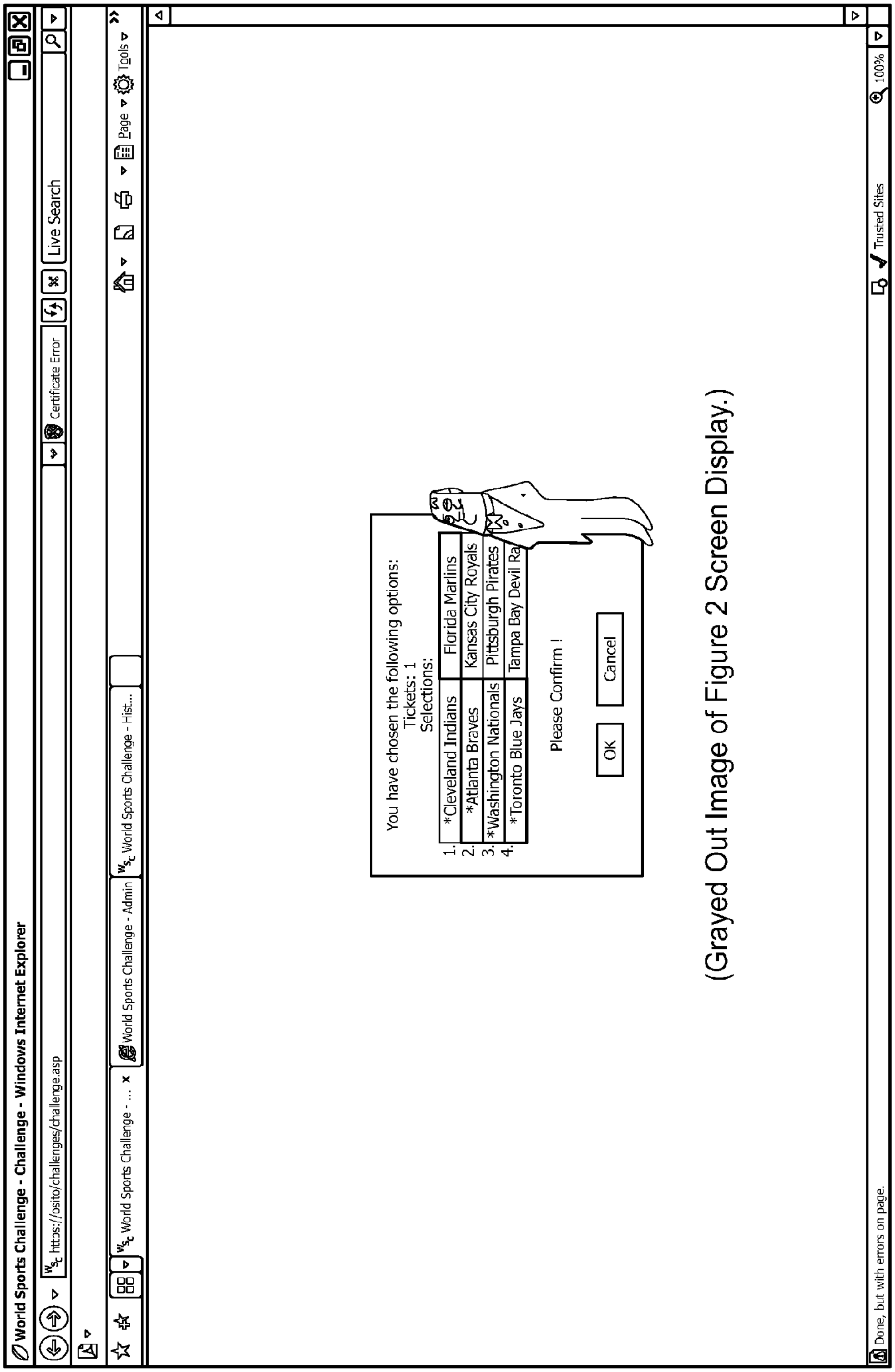
Figure 4:
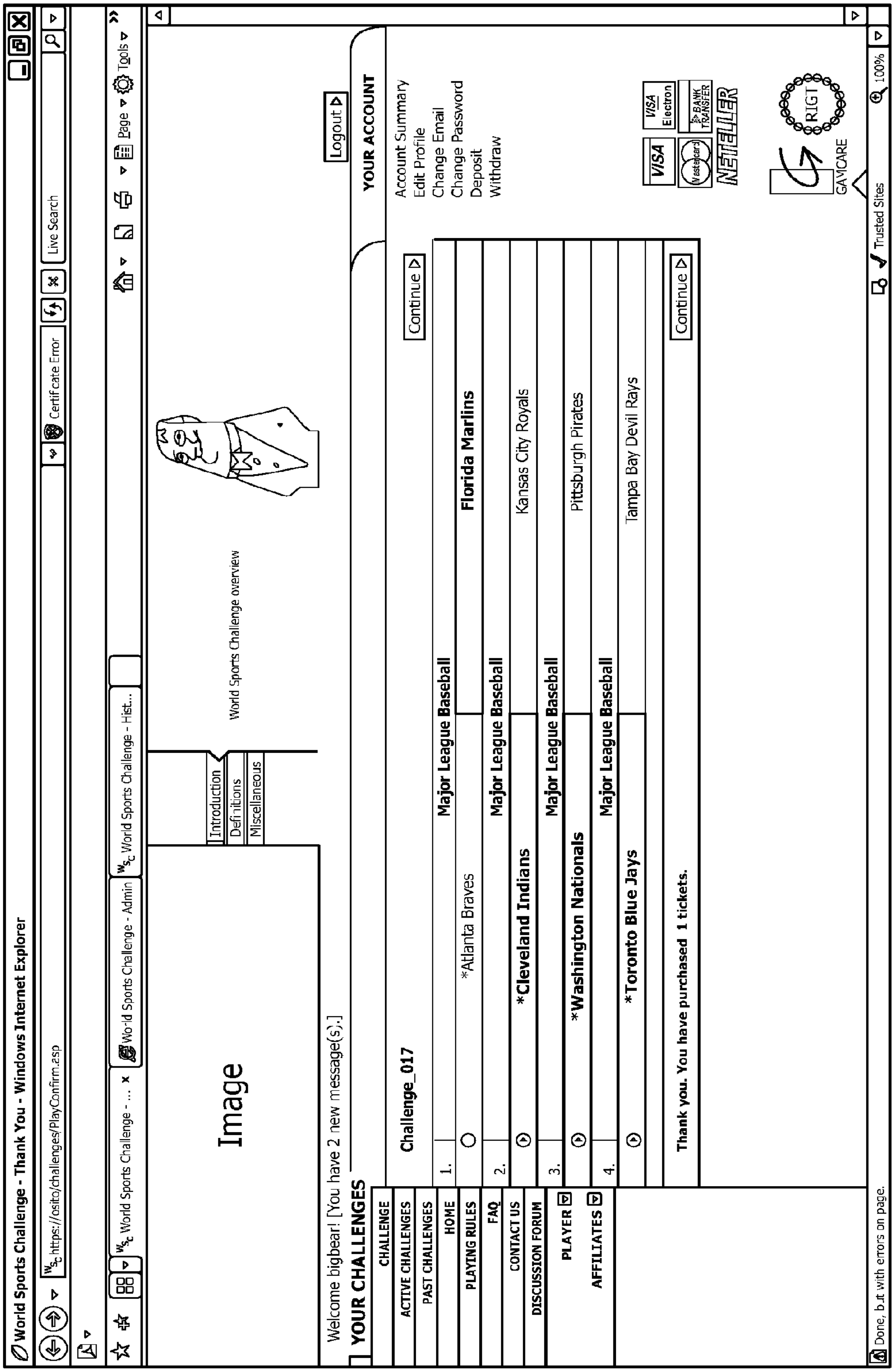

FIGS. 3 and 4: Player confirms the ticket purchase (FIG. 3) and is brought to a page that shows the played ticket (FIG. 4). The Player clicks on "Continue" and is brought to FIG. 5.

Figure 5:
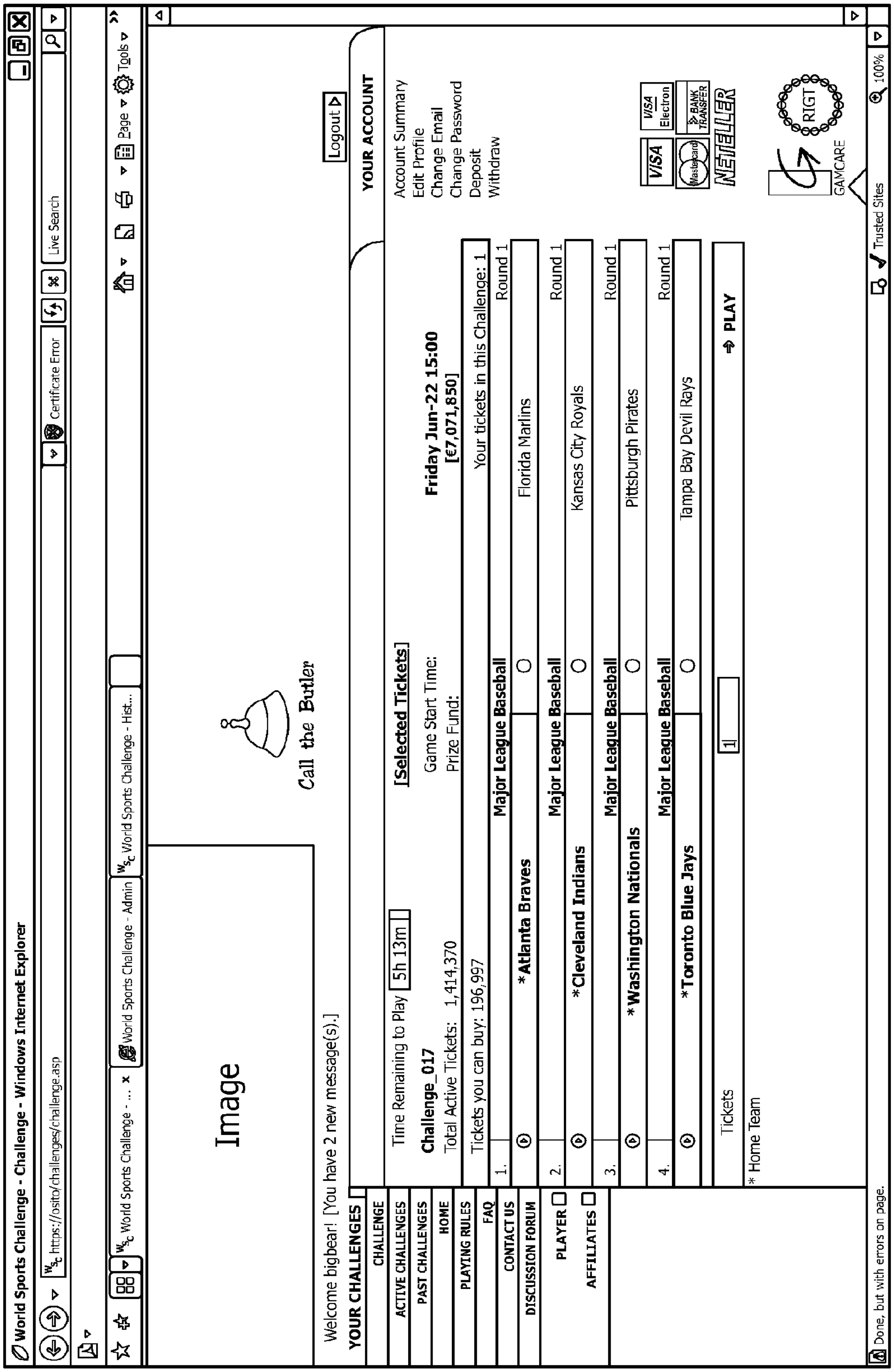

FIG. 5: Player can pick four more winners and the respective number of tickets to be played for the new combination of winners (here, the player selected "1" ticket). The Player could also select the same combination of winners as was selected in FIG. 2. The new selection is also confirmed in the same manner as shown in FIGS. 3 and 4. The Player then leaves the website and waits for the beginning of the Game Day.

Figure 6:
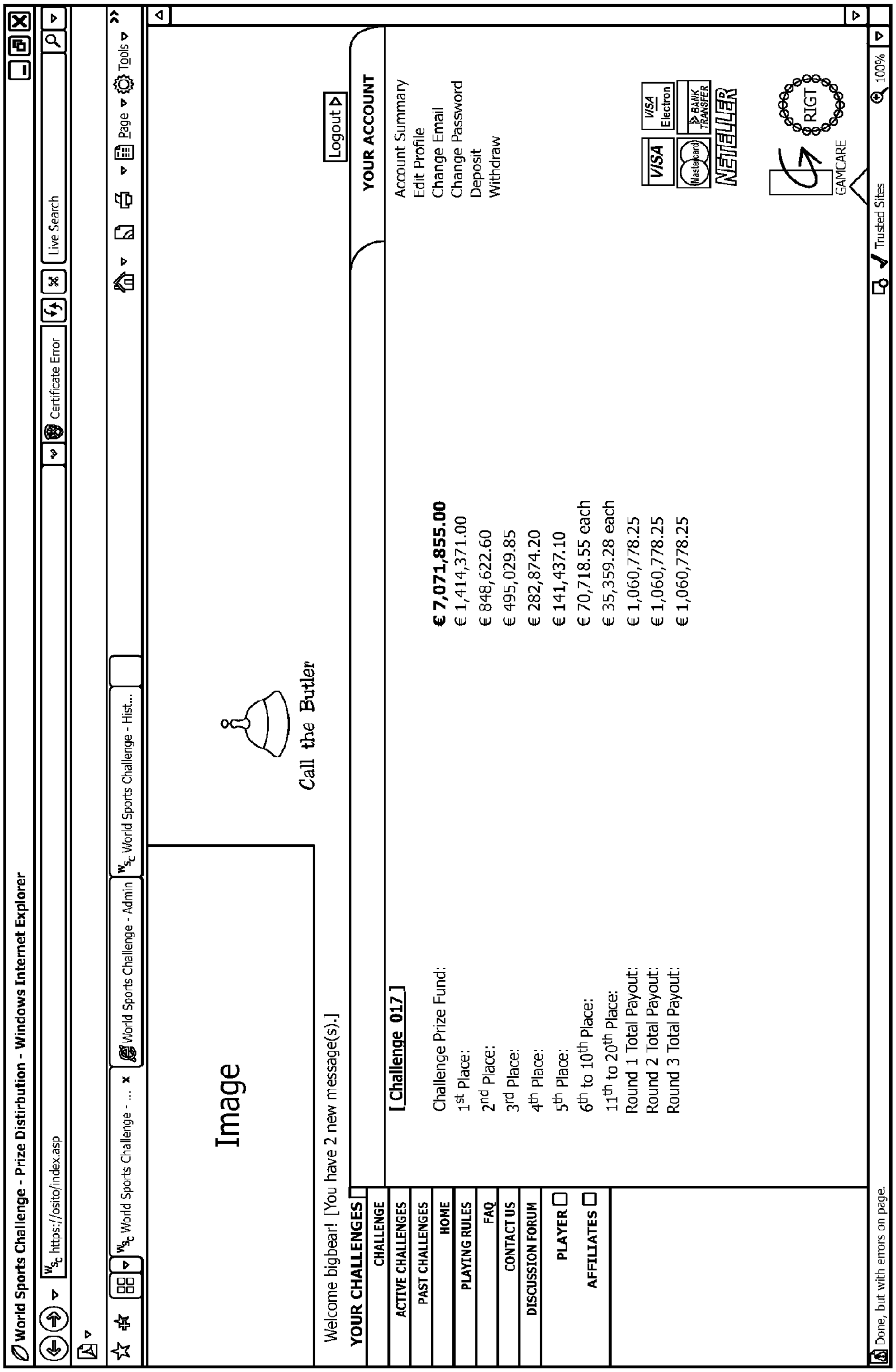
Figure 7:
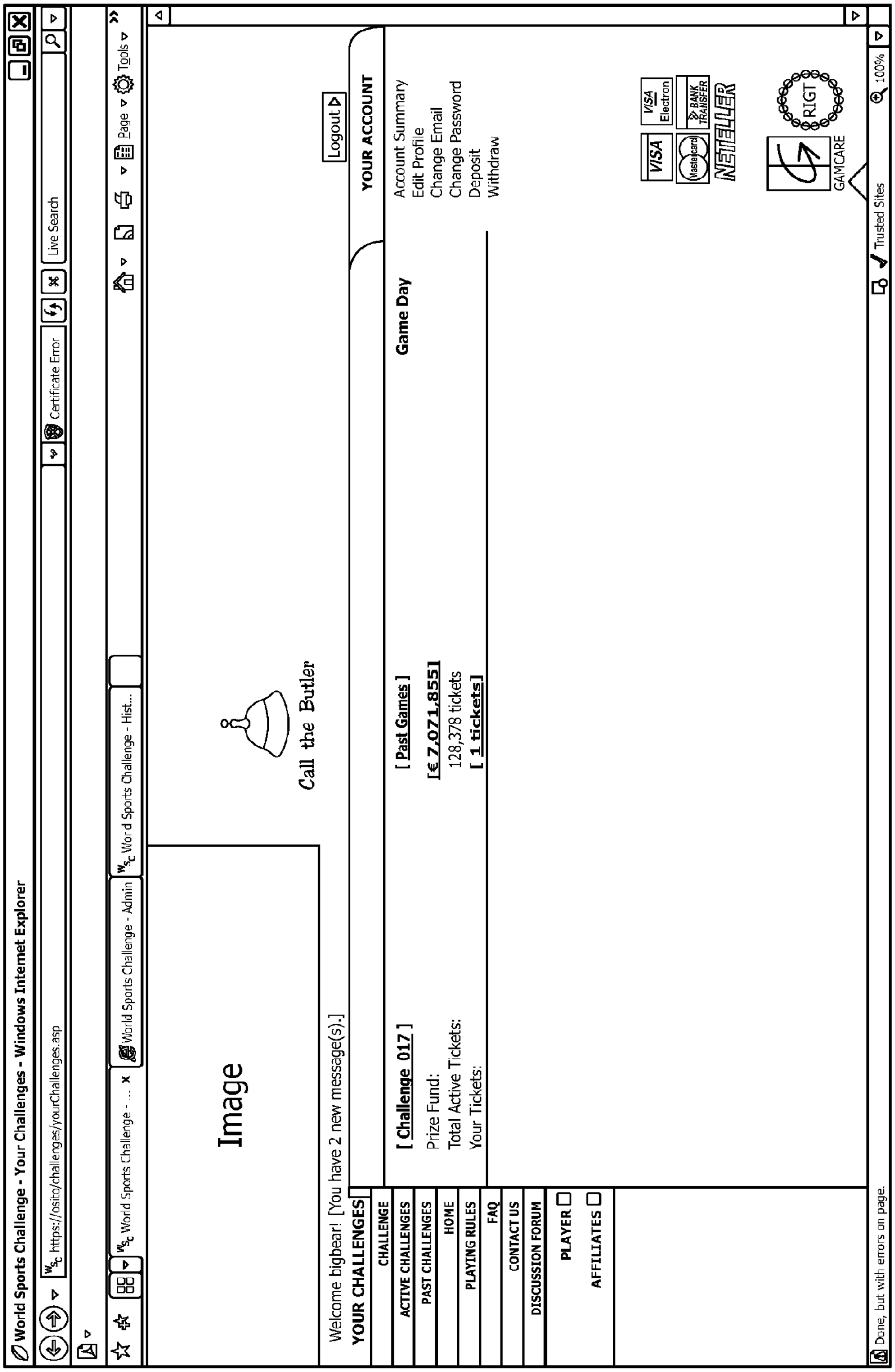
Figure 8:
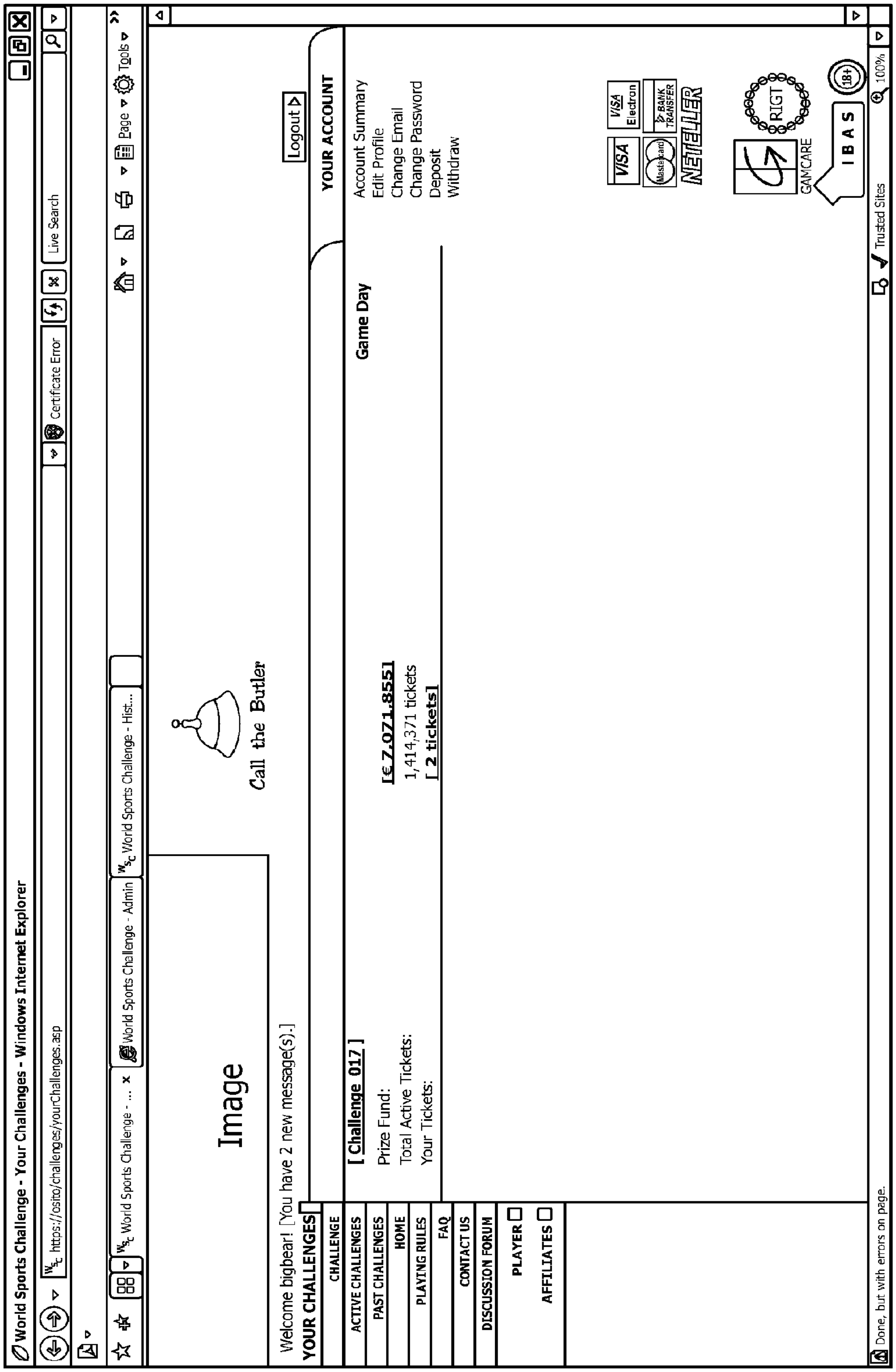

FIGS. 6-8: On Game Day, the Player may, if desired, log back into the website, click on "Your Challenges," and be shown the Player's Challenges for which live tickets still exist (FIG. 6). In this example, the two recently purchased tickets for Challenge 017 are shown. In addition, by clicking on the Prize Fund Amount, the Player can view the Prize Fund Table (FIG. 7), and by clicking on "Challenge 017," the Player can view the Game Splits Chart (FIG. 8). The Game Splits Chart shows all of the scenarios that may occur depending upon which team wins. For example, if the Atlanta Braves wins, then the 737,993 tickets that selected the Atlanta Braves split on the next game is 299,604 tickets for the Cleveland Indians and 438,389 tickets for the Kansas City Royals. The tickets of the logged in Player are shown in red. It is not necessary for the Player to view the Prize Fund Table or the Game Splits Chart, but viewing these tables and charts adds a level of interest to the Challenge. The Player will then exit the website and will log back in at a later time.

Figure 9:
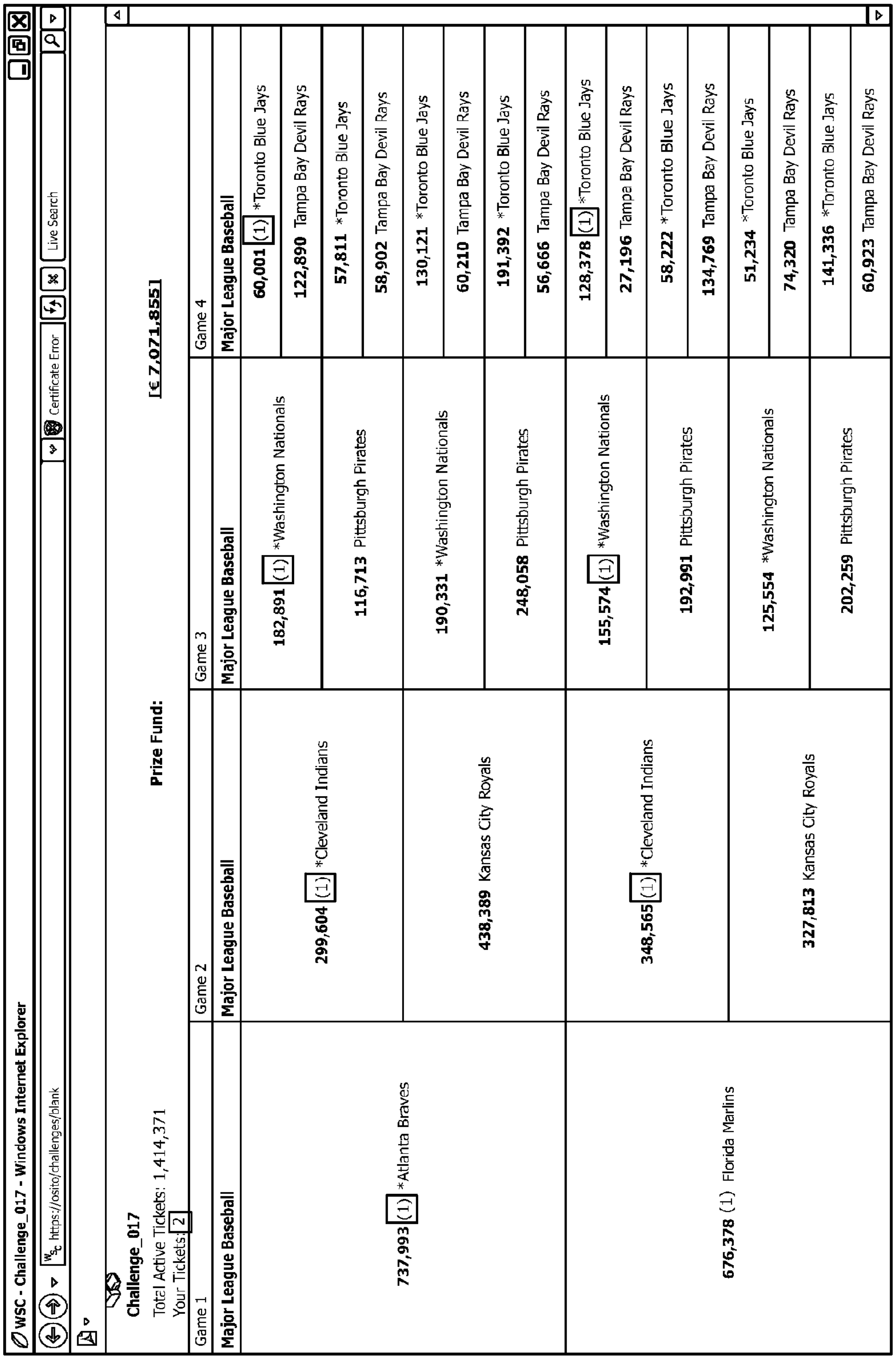

FIG. 9: On Selection Day, the Player logs back into the website, selects "Your Challenges," and is informed that there is one live ticket for which game selections must be made. Of the Player's two original tickets, one ticket from Games 1-4 (Set 1) advances to Games 5-8 (Set 2) because all four selected teams won, and one ticket from Games 1-4 (Set 1) is eliminated at Game 1 because Atlanta was picked to win but they lost.

Figure 10:
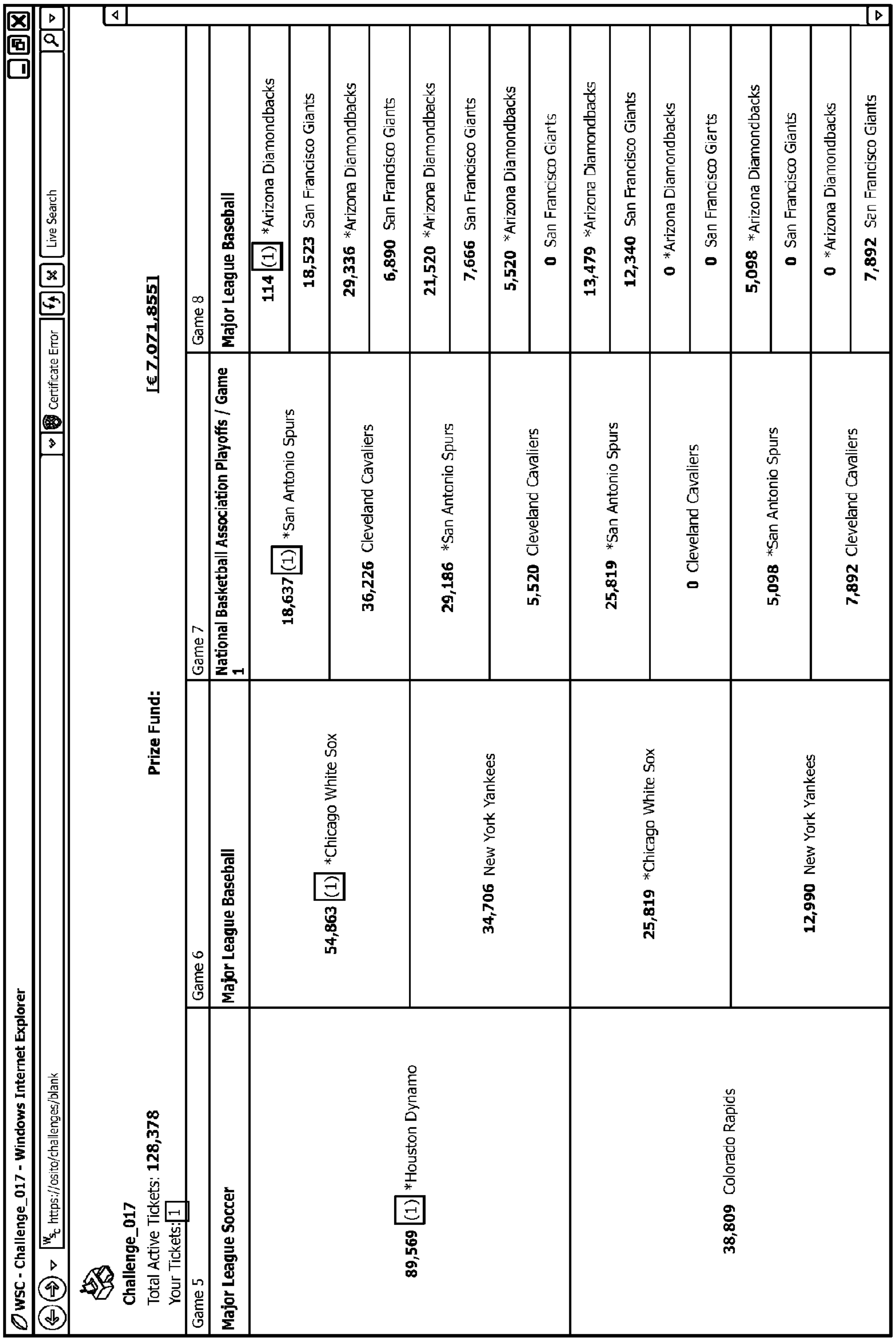

FIG. 10: If desired, the Player may click on "Past Games" to view scores and Round Payouts. The total Round Payout given in the Prize Fund Table is divided by the number of live tickets after the four games. Here, the payout per ticket is € 8.26.

Figure 11:
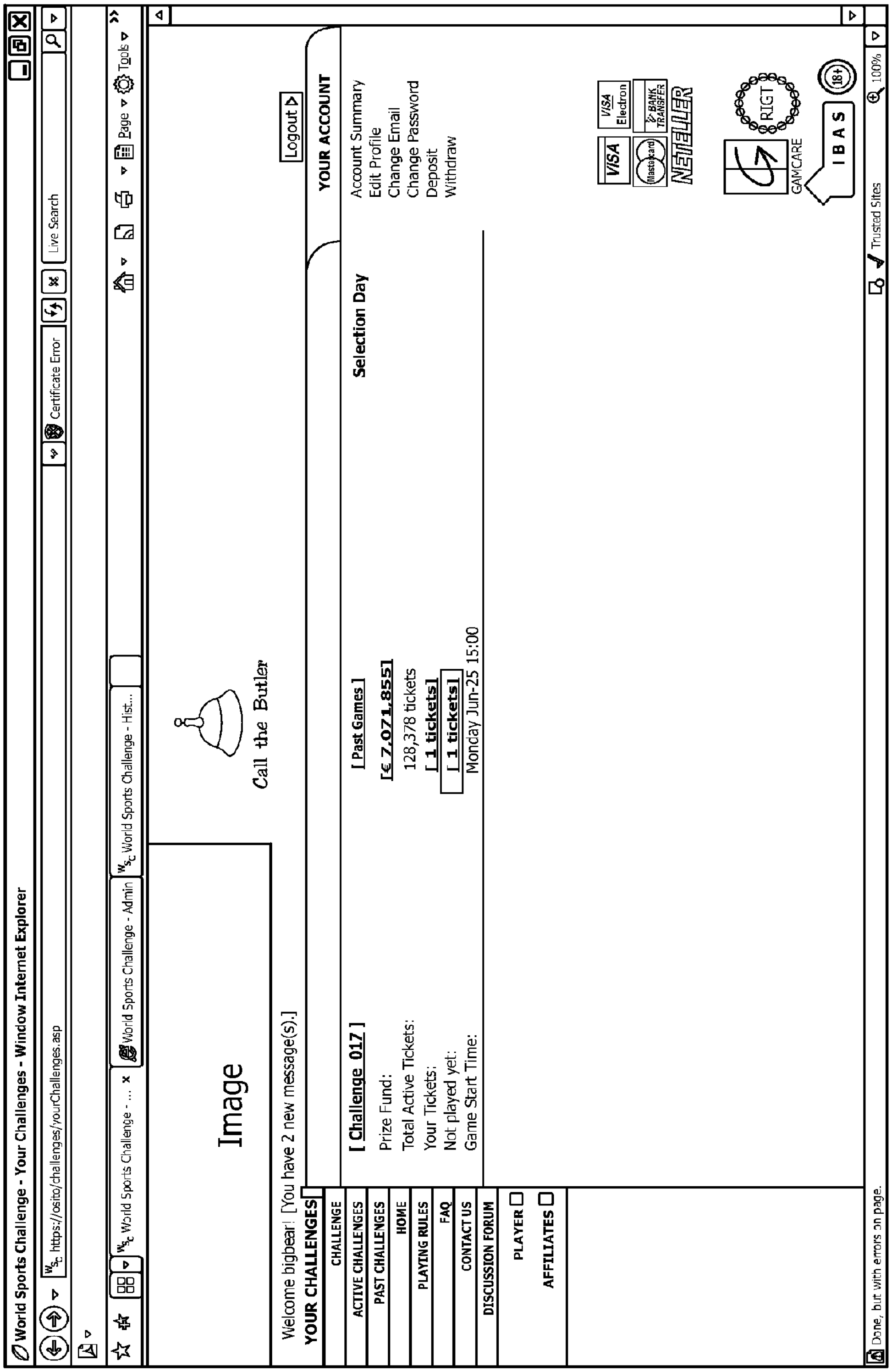

FIG. 11: The Player selects "Your Challenges" and then decides to pick predicted winners for the live ticket that advanced to Games 5-8 (Set 2). The process described in FIGS. 2-4 is then repeated for that one live ticket only. If the Player had other live tickets, the Player could then play the same or different combinations for those other live tickets. After the beginning if Game Day 1 of Challenge 017, Players cannot purchase more tickets. Thus, the ticket pool at this stage in the process are only those tickets that correctly selected the winners of the first four games.

Figure 12:
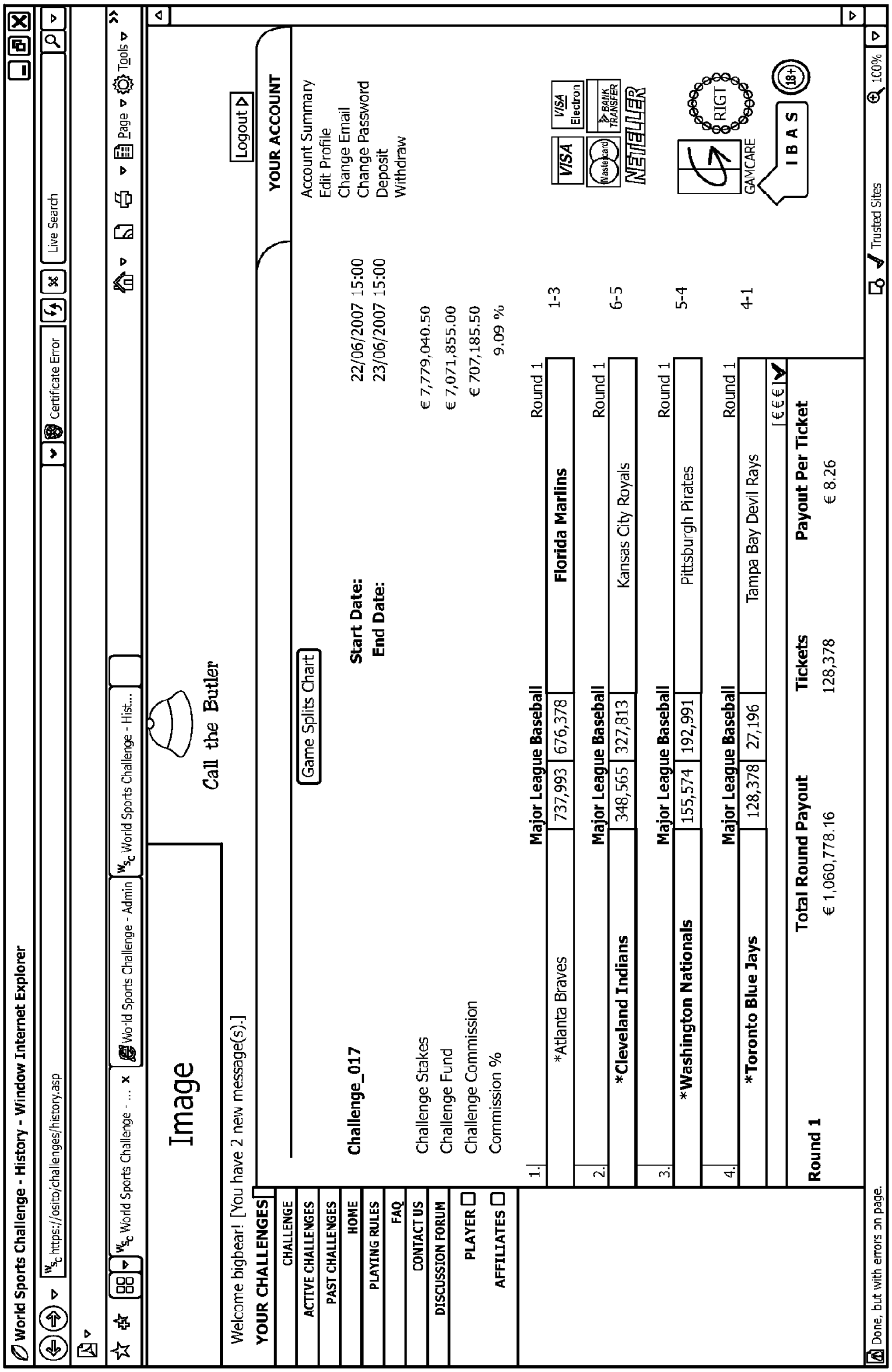
Figure 13:
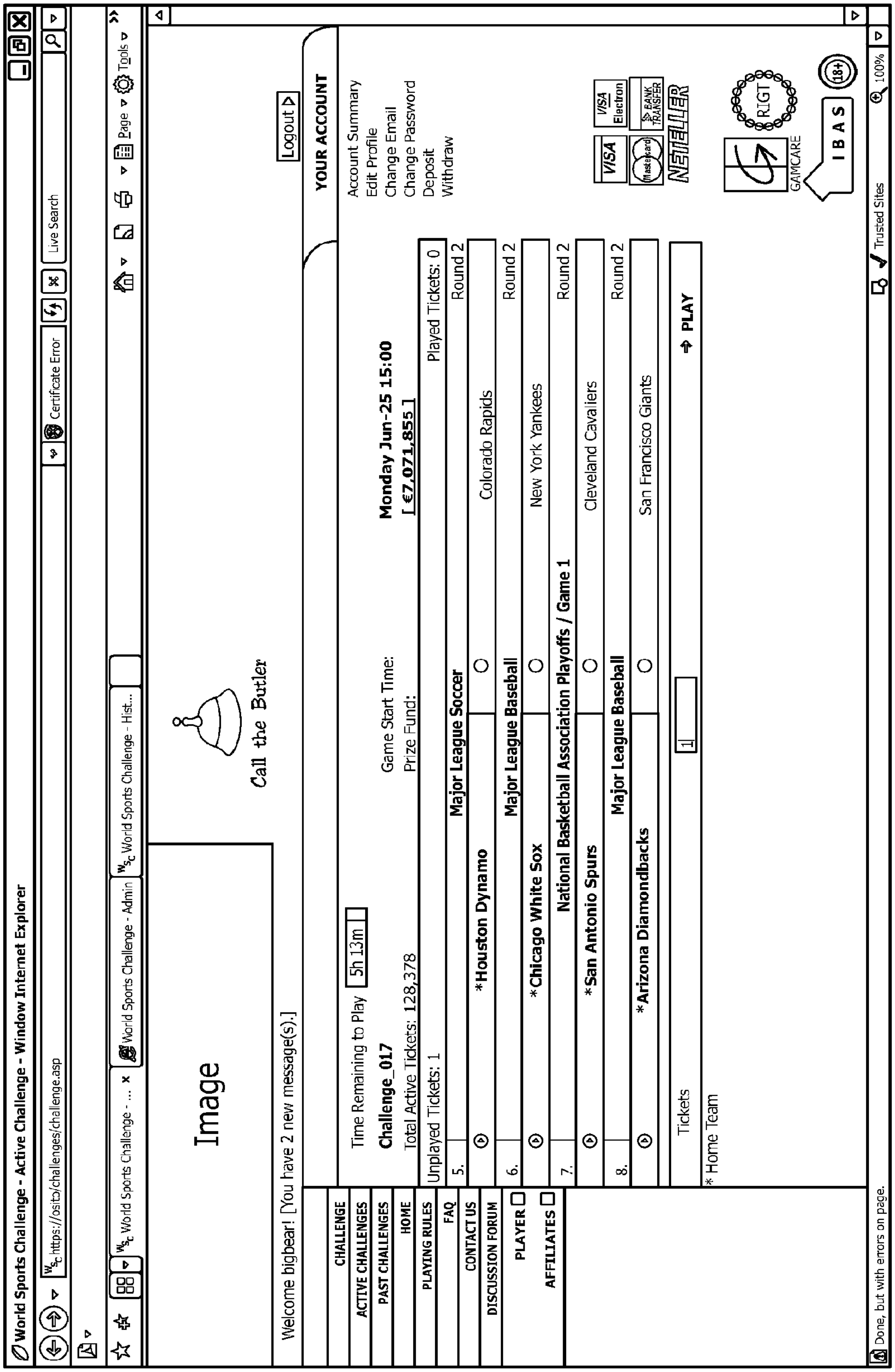

FIGS. 12-13: On Game Day, the Player may, if desired, log back into the website, click on "Your Challenges," and be shown the Player's Challenges for which live tickets still exist. In this example, the one live ticket for Challenge 017 that advanced to Set 2 is shown, along with the Prize Fund and the Total Live (Active) Tickets. The Prize Fund always remains fixed once Game Day 1. The Player can then click on "Challenge 017" to view the Game Splits Chart for Games 5-8 (Set 2) for the Total Live (Active) Tickets (FIG. 13). FIG. 13 is similar to FIG. 8, except that FIG. 13 relates to Games 5-8 (Set 2) and there is a reduced set of live tickets.

Figure 14:
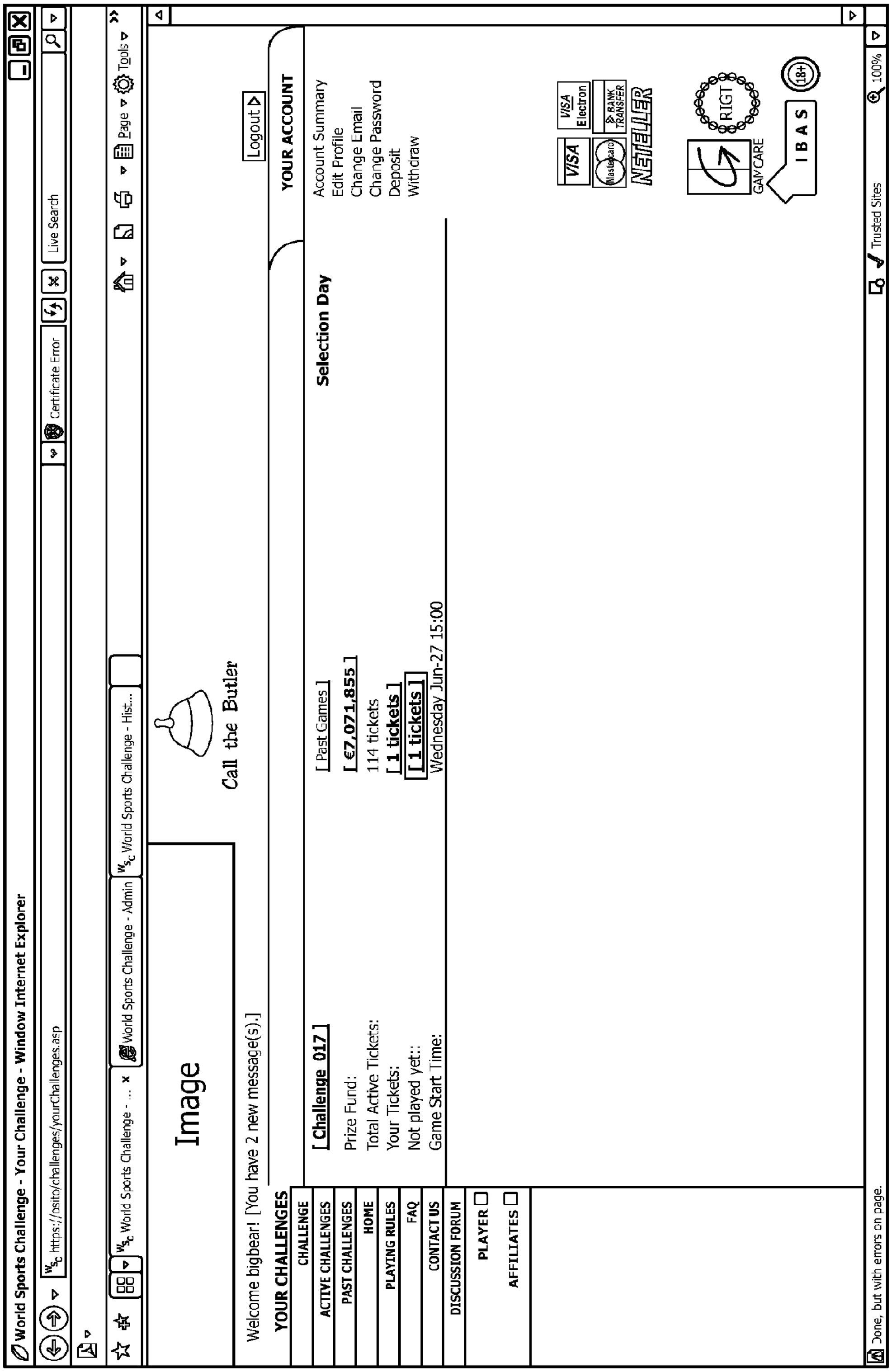

FIG. 14: On Selection Day, the Player logs back into the website, selects "Your Challenges," and is informed that there is still one live ticket for which game selections must be made because the Player correctly selected winners for Games 5-8. That is, the Player's ticket is still live and thus advances to Games 9-12 (Set 3) in the same manner as described above for advancing from Games 1-4 (Set 1) to Games 5-8 (Set 2).

Figure 15:
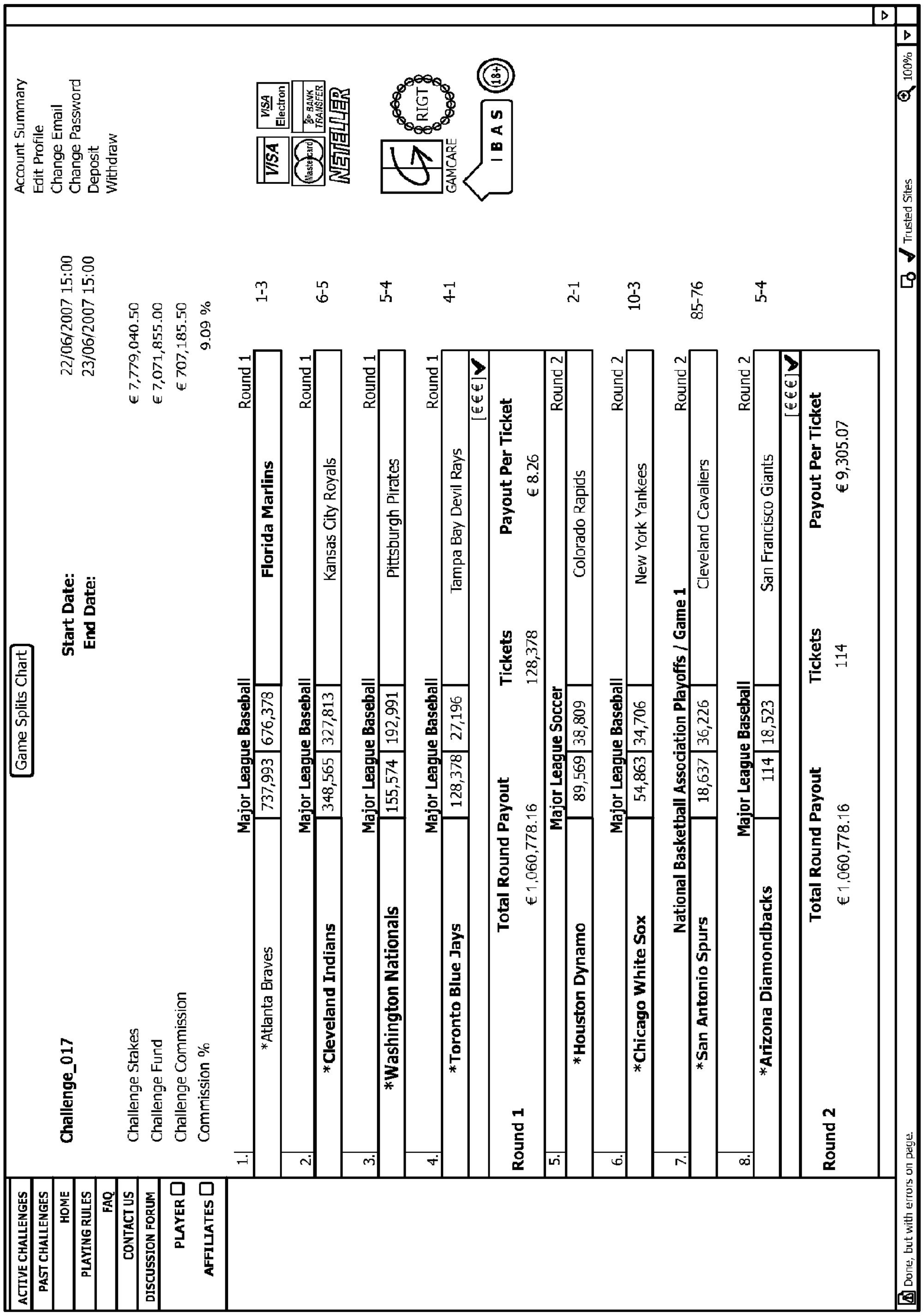

FIG. 15: If desired, the Player may click on "Past Games" to view scores and Round Payouts. The total Round Payout given in the Prize Fund Table is divided by the number of live tickets after the four games. Here, the payout per ticket for Round 2 is € 9,305.07. The Player then selects "Your Challenges" and then decides to pick predicted winners for the live ticket that advanced to Games 9-12 (Set 3). The process described in FIGS. 2-4 is then repeated for that one live ticket only. The screen displays for the Set 3 selection process are not shown. On Game Day, the Player can again view the latest Prize Fund Table and Game Splits Chart in the same manner as described above.

Figure 16:
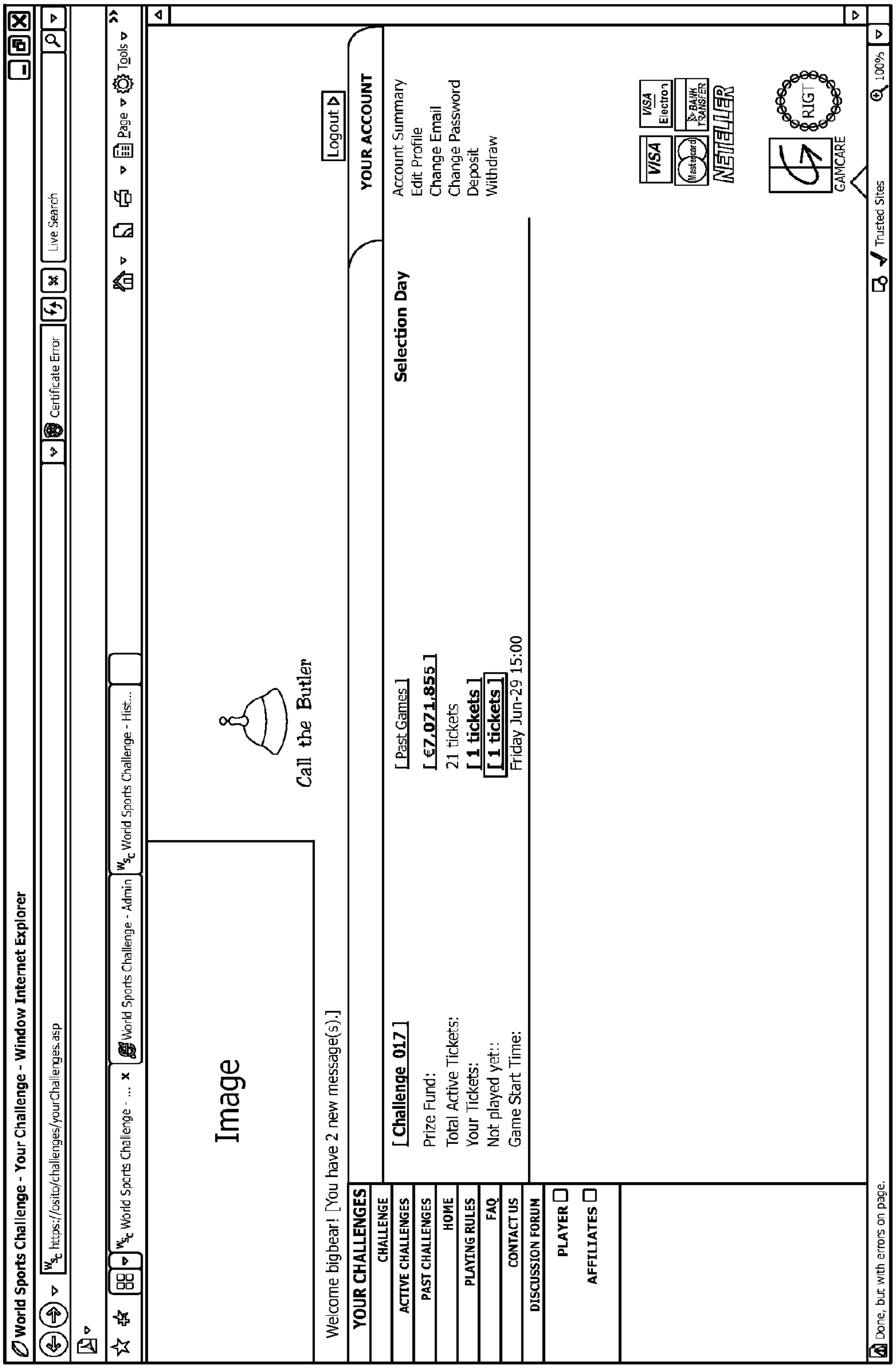

FIG. 16: On Selection Day, the Player logs back into the website, selects "Your Challenges," and is informed that there is still one live ticket for which game selections must be made because the Player correctly selected winners for Games 9-12. That is, the Player's ticket is still live and thus advances to Games 13-16 (Set 4) in the same manner as described above for advancing from Games 1-4 (Set 1) to Games 5-8 (Set 2) to Games 9-12 (Set 3). The display screens for these additional steps are not shown. When Challenge 017 ends, display screens such as FIGS. 9, 14 and 16 will not appear in "Your Challenges" because the logged in Player has no live tickets for Challenge 017.

Figure 17:
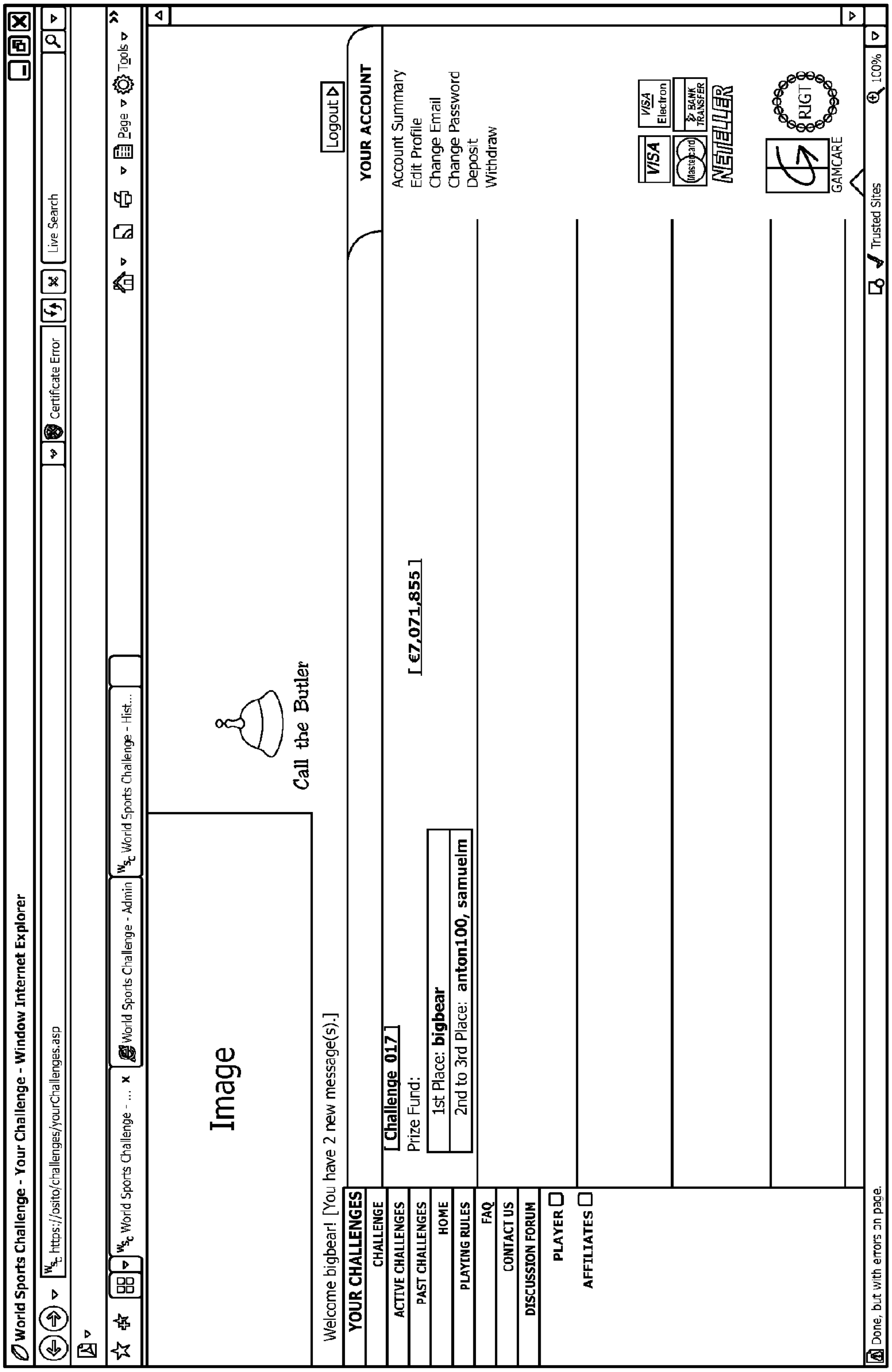
Figure 18:
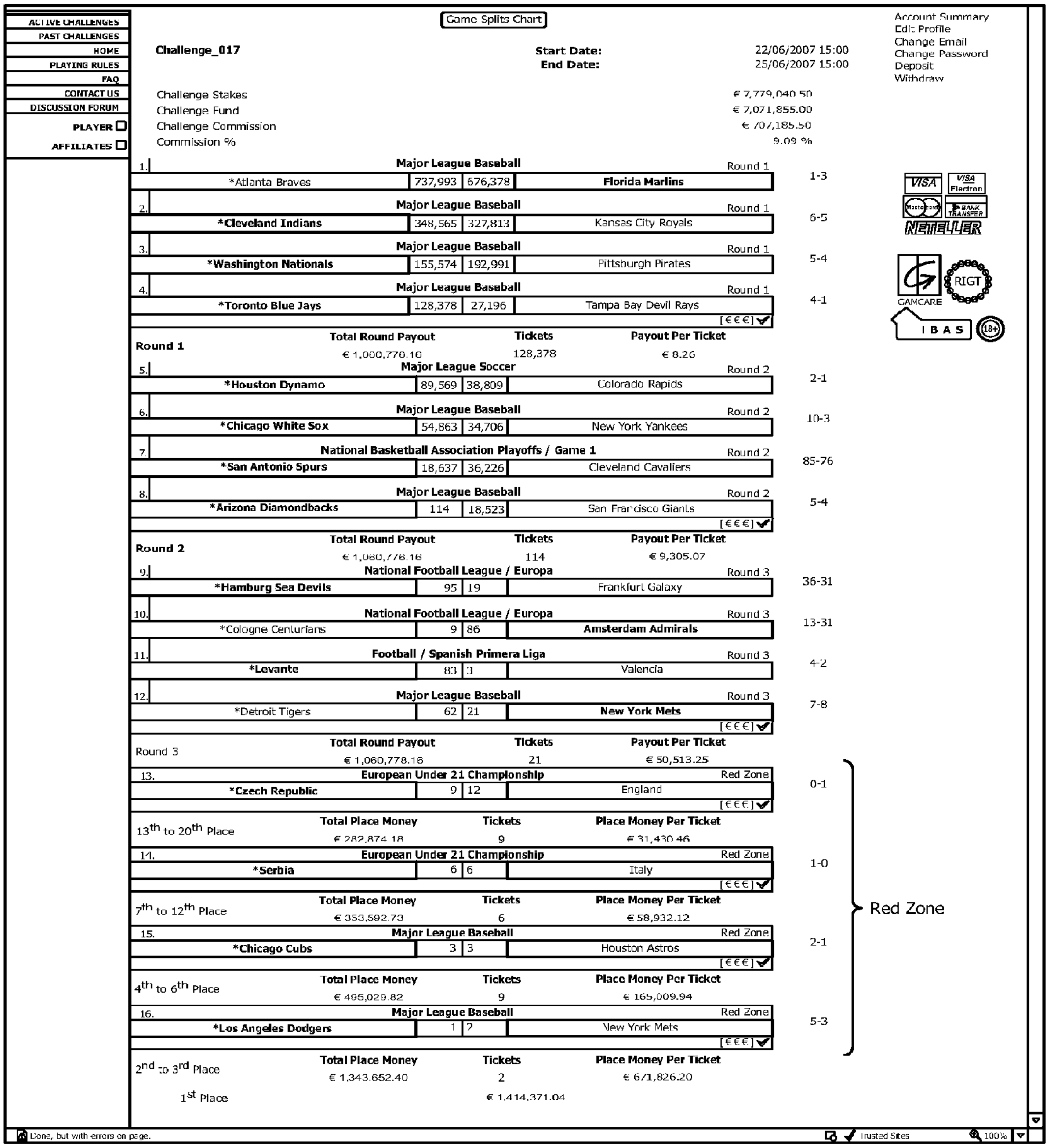
Figure 19:
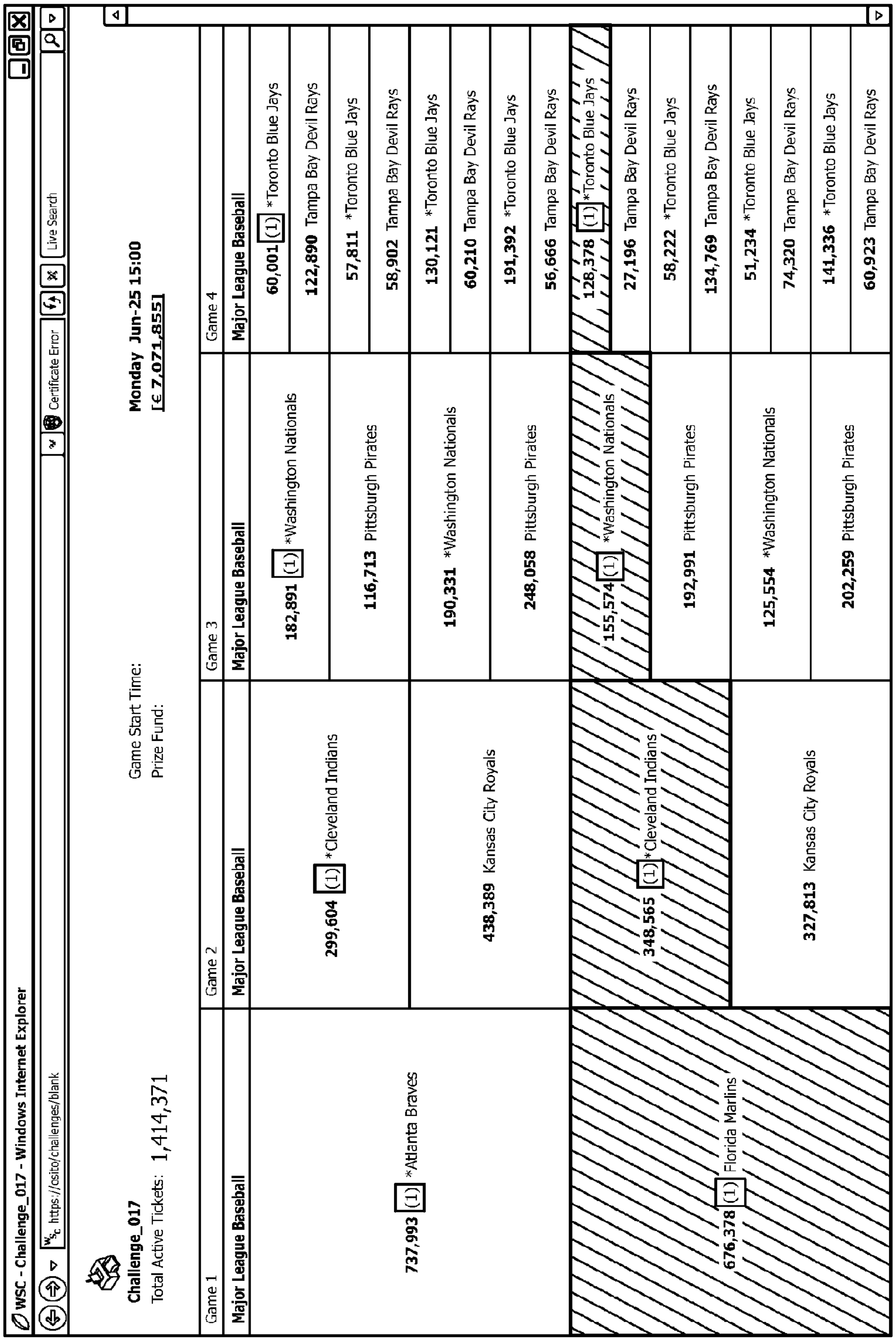
Figure 20:
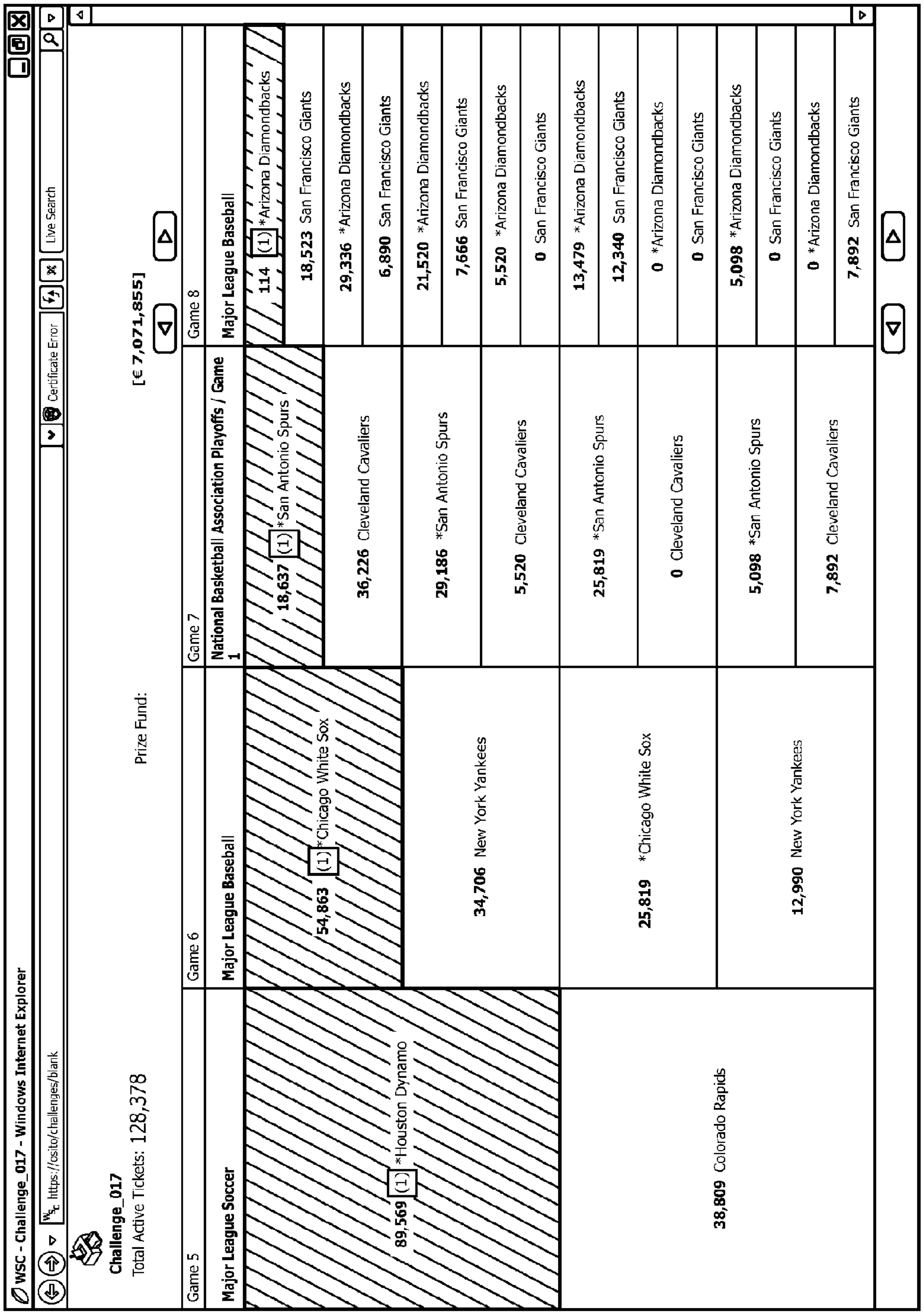
Figure 21:
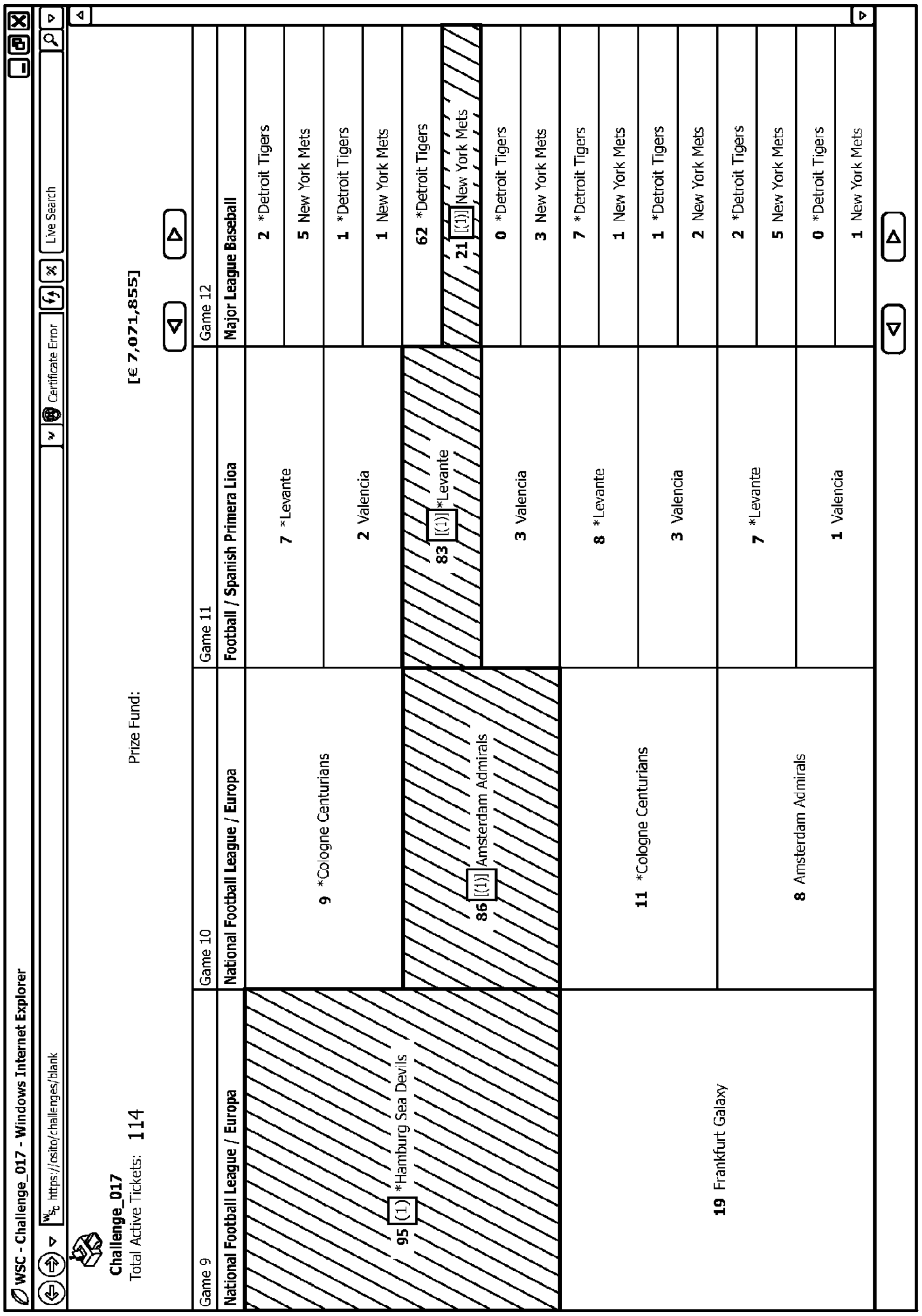
Figure 22:
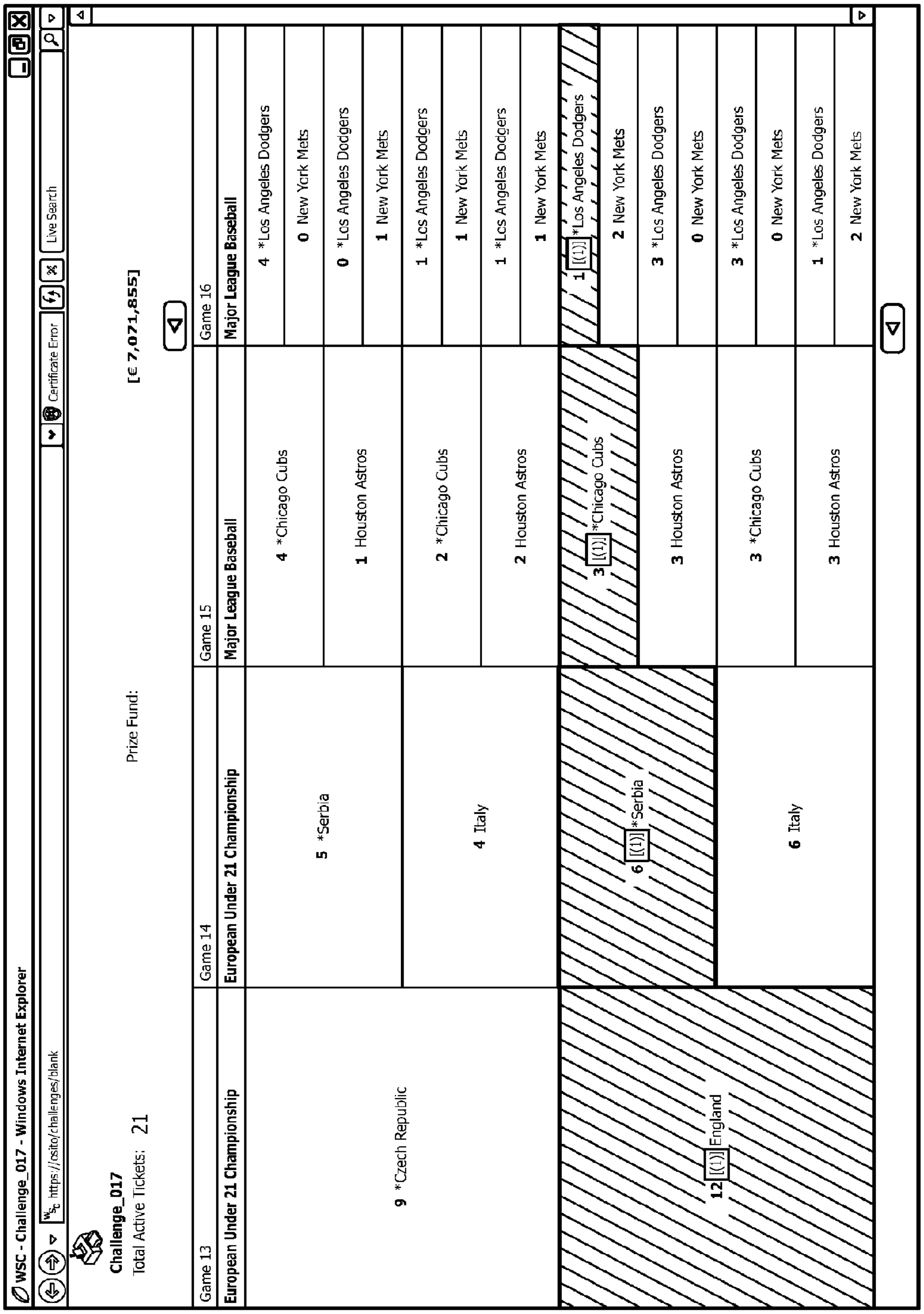
Figure 23:
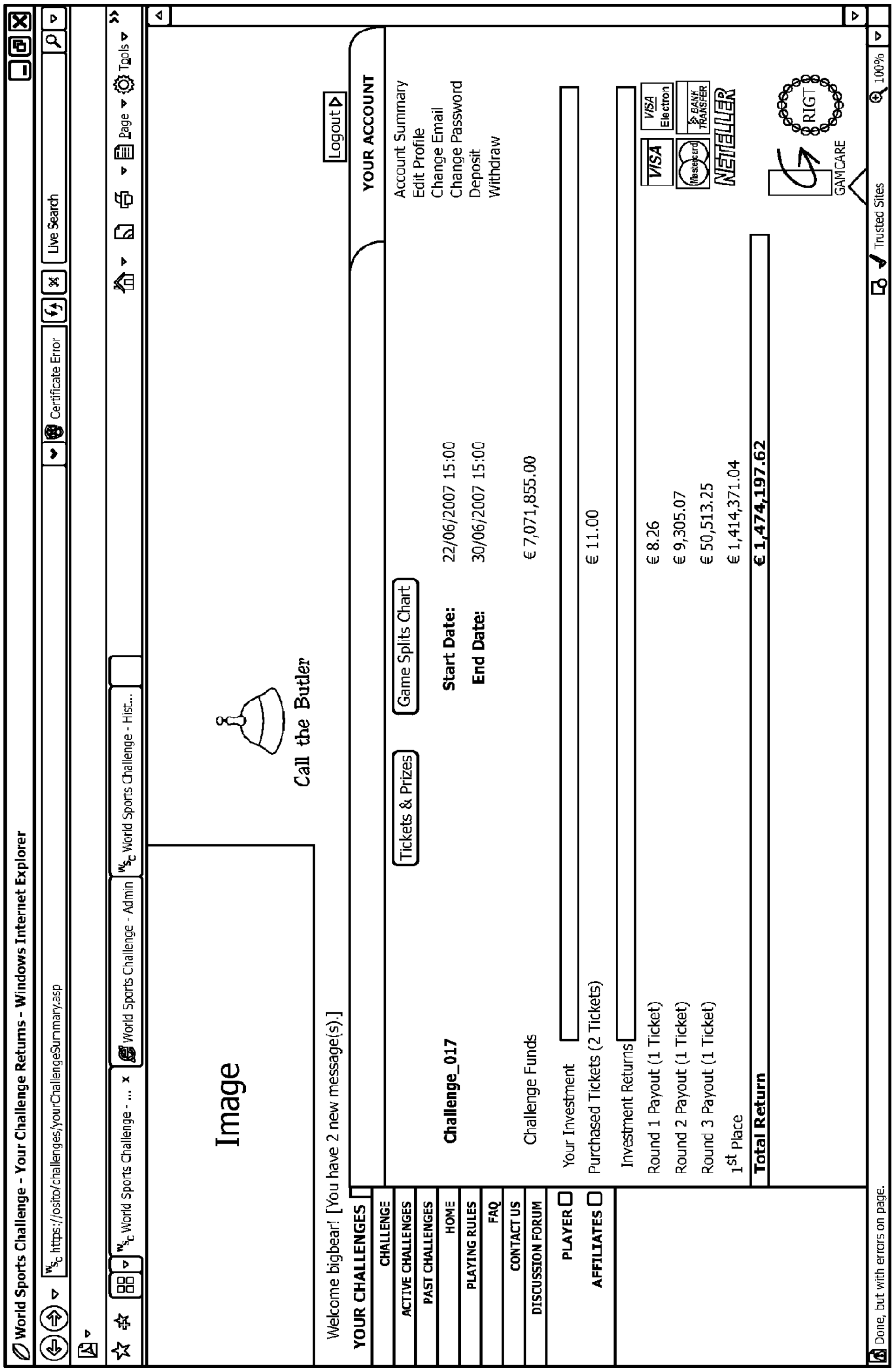
Figure 24:
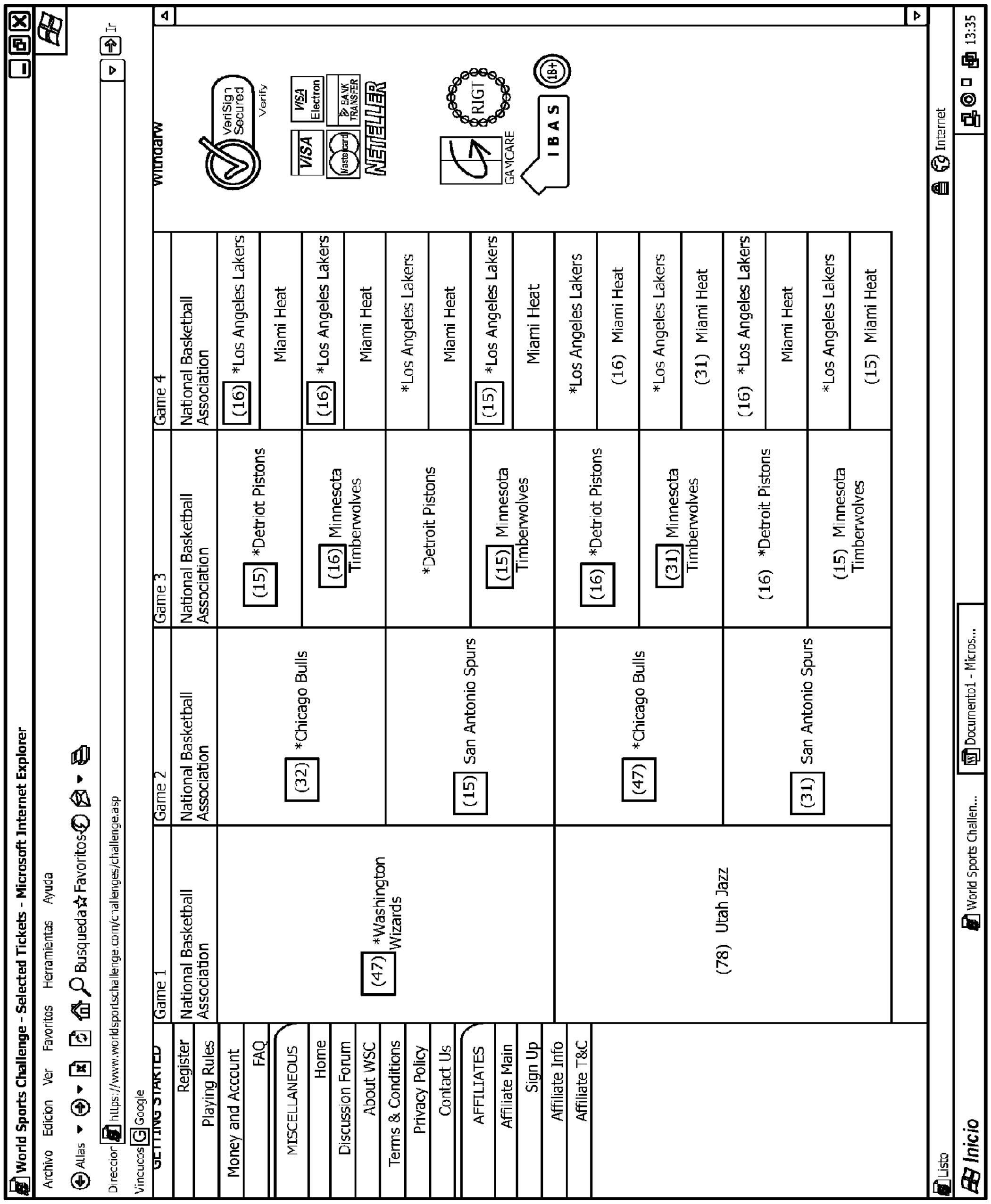

FIGS. 17-24: The results and history of Challenges can be viewed by clicking on "Past Challenges" (FIG. 17). Typically, there will be a plurality of Past Challenges shown on this display screen. For simplicity, only the results and history of Past Challenge 017 is shown. If the Player clicks on "Challenge 017," a "Tickets and Prizes Chart" is displayed that shows the detailed results and history of Challenge 017 (FIG. 18). For example, this chart shows how the ticket pool was reduced from the original 1,414,371 tickets to one ticket that wins $1^{st}$ place. FIGS. 19-22 show Game Splits Charts for Games 1-16 of Challenge 017. Winning teams are shown in darkened rectangles and the previously selected tickets of the logged in Player are identified in red. Four games at a time (one set) are visible on each display screen. The number of tickets that are live after a Game are the same number that advance to the next Game. For example, as shown in FIG. 19, 128,378 tickets are live after Game 4. These tickets all advance to Game 5 as shown in FIG. 20 wherein 89,569 selected Houston Dynamo and 38,809 selected the Colorado Rapids (89,569+38,809=128,378). FIG. 23 shows financial results of tickets purchased by a Player. FIG. 24 is another type of display screen that shows the ticket selections made by a Player for each Game. This display screen is similar to FIG. 8, except that it shows only the Player's game selections (that is, red tickets only). FIG. 24 shows selections for a different Challenge than the previously described example. At Set 1, the Player must make a selection of predicted winners for the Games. At any time after Set 1, the Player does not have to return to the website to make subsequent selections for live tickets that advance to subsequent Sets. If the Player does not make a selection for any given subsequent Set, the system will make an automated random selection for the Player's live tickets. In this manner, all live tickets advance to the next Game regardless of whether or not the Player makes a selection.

I. Additional Considerations

The claim limitations wherein each ticket "selects a game result" means that the ticket holder or owner (player) selects the contest result for his or her respectively held or owned tickets. If the Challenge has passed the first game and the Player has not made a selection, the selection is made by WSC as described above.

In the illustrated example, four games are selected at a time. However, the scope of the present invention includes embodiments wherein other amounts of games are selected at a time, including one game, two games, three games, or more than four games.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A computer-implemented method of administering a parlay-based tournament playable by a plurality of players, the tournament including a plurality of successive games, each game having a ticket pool and a plurality of game results, wherein an administration computer administers the parlay-based tournament, the method comprising:

(a) identifying a first game;

(b) accepting ticket orders from a plurality of players prior to the outcome of the first game without the administration computer informing each player of the game results selected in the ticket orders of the other players, each ticket selecting a game result from the plurality of game results for the first game and one or more successive games, the total amount of accepted ticket orders defining the ticket pool for the first game;

(c) identifying the tickets in the ticket pool that successfully selected the game result of the first game;

(d) identifying a second game;

(e) parlaying only the tickets that successfully selected the first game result to the second game, the total amount of parlayed tickets defining the ticket pool for the second game, wherein the ticket pool for the second game is smaller than the ticket pool for the first game;

(f) prior to the outcome of the second game, the administration computer identifying the game result of each parlayed ticket from the plurality of game results for the second game;

(g) identifying using the administration computer the tickets in the ticket pool of the second game that successfully selected the game result of the second game;

(h) identifying one or more additional successive games;

(i) parlaying only the tickets that successfully selected the second game result to one or more additional successive games, the ticket pool for each of the successive games being defined by the tickets that successfully selected the previous game result;

(j) for each of the one or more additional successive games, prior to the outcome of the successive game, the administration computer identifying the game result of each parlayed ticket from the plurality of game results for the successive game; and (k) for each of the one or more additional successive games, identifying using the administration computer the tickets in the ticket pool of the successive game that successfully selected the game result, wherein after completion of the first game and the one or more successive games, each successfully parlayed ticket selecting game results for additional successive games, and wherein when game results are selected, less than all of the game results are selected.

2. The method of claim 1 wherein steps (h) through (k) are repeated until the ticket pool reaches a predetermined number of tickets.

3. The method of claim 2 wherein the predetermined number of tickets is one ticket.

4. The method of claim 2 wherein each ticket has a purchase value, the method further comprising:

(l) defining a prize pool for the tournament that is equivalent to a predetermined percentage of the purchase value of all of the tickets in the ticket pool;

(m) ranking the tickets based on their success in correctly selecting consecutive successive game results starting from the first game; and (n) awarding a predetermined percentage of the prize pool to a predetermined number of top-ranked tickets.

5. The method of claim 1 wherein steps (h) through (k) are repeated until a predetermined number of games has occurred.

6. The method of claim 1 wherein each ticket has a purchase value, the method further comprising:

(l) defining a prize pool for the tournament that is equivalent to a predetermined percentage of the purchase value of all of the tickets in the ticket pool; and (m) awarding a predetermined percentage of the prize pool to the tickets identified in steps (c) or (g) or (k).

7. The method of claim 1 further comprising:

(l) providing a user interface display accessible by the players, the user interface display showing a game splits grid that displays how many tickets are left in the ticket pool, and how many tickets belong to a particular player.

8. The method of claim 1 wherein the games are sports events wherein two teams or competitors play against each other.

9. The method of claim 1 further comprising:

(l) providing an animated character that explains rules of the tournament.

10. The method of claim 1 wherein there are more than four games in the tournament and when game results are selected in at least step (b), the next four game results are selected, and wherein after completion of the four games, each successfully parlayed ticket selecting game results for additional successive games.

11. A non-transitory, tangible article of manufacture for administering a parlay-based tournament playable by a plurality of players, the tournament including a plurality of successive games, each game having a ticket pool and a plurality of game results, wherein an administration computer administers the parlay-based tournament, the article of manufacture comprising computer-readable medium encoded with computer-executable instructions for performing a method comprising:

(a) identifying a first game;

(b) accepting ticket orders from a plurality of players prior to the outcome of the first game without the administration computer informing each player of the game results selected in the ticket orders of the other players, each ticket selecting a game result from the plurality of game results for the first game and one or more successive games, the total amount of accepted ticket orders defining the ticket pool for the first game;

(c) identifying the tickets in the ticket pool that successfully selected the game result of the first game;

(d) identifying a second game;

(e) parlaying only the tickets that successfully selected the first game result to the second game, the total amount of parlayed tickets defining the ticket pool for the second game, wherein the ticket pool for the second game is smaller than the ticket pool for the first game;

(f) prior to the outcome of the second game, the administration computer identifying the game result of each parlayed ticket from the plurality of game results for the second game;

(g) identifying using the administration computer the tickets in the ticket pool of the second game that successfully selected the game result of the second game;

(h) identifying one or more additional successive games;

(i) parlaying only the tickets that successfully selected the second game result to one or more additional successive games, the ticket pool for each of the successive games being defined by the tickets that successfully selected the previous game result;

(j) for each of the one or more additional successive games, prior to the outcome of the successive game, the administration computer identifying the game result of each parlayed ticket from the plurality of game results for the successive game; and (k) for each of the one or more additional successive games, identifying using the administration computer the tickets in the ticket pool of the successive game that successfully selected the game result, wherein after completion of the first game and the one or more successive games, each successfully parlayed ticket selecting game results for additional successive games, and wherein when game results are selected, less than all of the game results are selected.

12. The article of manufacture of claim 11 wherein steps (h) through (k) are repeated until the ticket pool reaches a predetermined number of tickets.

13. The article of manufacture of claim 12 wherein the predetermined number of tickets is one ticket.

14. The article of manufacture of claim 12 wherein each ticket has a purchase value, and the computer-executable instructions perform a method further comprising:

(l) defining a prize pool for the tournament that is equivalent to a predetermined percentage of the purchase value of all of the tickets in the ticket pool;

(m) ranking the tickets based on their success in correctly selecting consecutive successive game results starting from the first game; and (n) awarding a predetermined percentage of the prize pool to a predetermined number of top-ranked tickets.

15. The article of manufacture of claim 11 wherein steps (h) through (k) are repeated until a predetermined number of games has occurred.

16. The article of manufacture of claim 11 wherein each ticket has a purchase value, and the computer-executable instructions perform a method further comprising:

(l) defining a prize pool for the tournament that is equivalent to a predetermined percentage of the purchase value of all of the tickets in the ticket pool; and (m) awarding a predetermined percentage of the prize pool to the tickets identified in steps (c) or (g) or (k).

17. The article of manufacture of claim 11 wherein the computer-executable instructions perform a method further comprising:

(l) providing a user interface display accessible by the players, the user interface display showing a game splits grid that displays how many tickets are left in the ticket pool, and how many tickets belong to a particular player.

18. The article of manufacture of claim 11 wherein the games are sports events wherein two teams or competitors play against each other.

19. The article of manufacture of claim 11 wherein the computer-executable instructions perform a method further comprising:

(l) providing an animated character that explains rules of the tournament.

20. The article of manufacture of claim 11 wherein there are more than four games in the tournament and when game results are selected in at least step (b), the next four game results are selected, and wherein after completion of the four games, each successfully parlayed ticket selecting game results for additional successive games.

* * * * *